US007716257B2

(12) United States Patent
Thomson et al.

(10) Patent No.: US 7,716,257 B2
(45) Date of Patent: May 11, 2010

(54) UNIVERSAL DRILL-DOWN SYSTEM FOR COORDINATED PRESENTATION OF ITEMS IN DIFFERENT DATABASES

(75) Inventors: Neil Thomson, Kanata (CA); Andre Paiement, Embrum (CA); Dave Gould, Hamilton (CA); Martin Petitclerc, Nepean (CA); Brian Donnelly, Orleans (CA); Gordon Chow, Nepean (CA)

(73) Assignee: Business Objects Software Ltd., Dublin (IE)

( * ) Notice: Subject to any disclaimer, the term of this patent is extended or adjusted under 35 U.S.C. 154(b) by 268 days.

(21) Appl. No.: 11/511,939

(22) Filed: Aug. 28, 2006

(65) Prior Publication Data

US 2006/0294098 A1    Dec. 28, 2006

Related U.S. Application Data

(63) Continuation of application No. 10/321,781, filed on Dec. 16, 2002, now Pat. No. 7,139,766.

(60) Provisional application No. 60/341,651, filed on Dec. 17, 2001.

(51) Int. Cl.
*G06F 17/30* (2006.01)
(52) U.S. Cl. .................. 707/809; 707/705; 707/756; 707/790; 707/802
(58) Field of Classification Search .............. 707/2–4, 707/103, 1, 100
See application file for complete search history.

(56) References Cited

U.S. PATENT DOCUMENTS

| 5,416,917 | A | * | 5/1995 | Adair et al. ............... 707/203 |
| 5,784,562 | A | | 7/1998 | Diener |
| 5,974,371 | A | | 10/1999 | Hirai et al. |
| 6,199,068 | B1 | | 3/2001 | Carpenter |
| 6,282,537 | B1 | | 8/2001 | Madnick et al. |
| 6,480,842 | B1 | * | 11/2002 | Agassi et al. ............... 707/4 |
| 6,549,906 | B1 | | 4/2003 | Austin et al. |
| 6,684,207 | B1 | * | 1/2004 | Greenfield et al. ......... 707/3 |
| 6,694,338 | B1 | * | 2/2004 | Lindsay .................. 707/203 |
| 6,707,454 | B1 | * | 3/2004 | Barg et al. ................ 345/440 |
| 6,711,585 | B1 | | 3/2004 | Copperman et al. |
| 2001/0023414 | A1 | | 9/2001 | Kumar et al. |
| 2002/0087516 | A1 | * | 7/2002 | Cras et al. ................. 707/2 |
| 2002/0116389 | A1 | * | 8/2002 | Chen et al. ............ 707/103 R |

* cited by examiner

*Primary Examiner*—Mohammad Ali
*Assistant Examiner*—Thuy (Tiffany) Bui
(74) *Attorney, Agent, or Firm*—Cooley Godward Kronish LLP

(57) ABSTRACT

A computer readable storage medium includes executable instructions to receive context information specifying dimensional criteria defining a first value in a first data source. A context transfer to a second value in a second data source is generated based upon the dimensional criteria. The context transfer is performed in accordance with a translation model with a translation map for mapping between multiple data sources. The second value is supplied.

8 Claims, 9 Drawing Sheets

| DTS.exe 202 ||
|---|---|
| DocManager.dll 204 | Translator.dll 206 |
| DTSModels.dll 208 ||
| XMLModule.dll 210 ||
| xerces-c_1_5.dll 212 ||

FIG. 2

| QueryModifier.dll 302 | | | |
|---|---|---|---|
| MSOLAP OM 314 | QM_OLAP.dll 306 | QM_WebI.dll 304 | DTSModels.dll 308 |
| | | | XMLModule.dll 310 |
| | | | xerces-c_1_5.dll 312 |
| Essbase OM 316 | | | |
| WICOM250.dll 318 | | | |

FIG. 3

Translation Map Model

UNIVERSAL DRILL-DOWN SYSTEM FOR COORDINATED PRESENTATION OF ITEMS IN DIFFERENT DATABASES

CROSS-REFERENCE TO RELATED APPLICATION

The present application is a continuation of U.S. patent application Ser. No. 10/321,781, entitled, UNIVERSAL DRILL-DOWN SYSTEM FOR COORDINATED PRESENTATION OF ITEMS IN DIFFERENT DATABASES filed on Dec. 16, 2002, now U.S. Pat. No. 7,139,766 which claims the benefit of priority under 35 U.S.C. §119 from U.S. Provisional Patent Application Ser. No. 60/341,651, entitled, UNIVERSAL DRILL-DOWN SYSTEM FOR COORDINATED PRESENTATION OF ITEMS IN DIFFERENT DATABASES filed on Dec. 17, 2001, the disclosures of which are hereby incorporated by reference in their entirety for all purposes.

COPYRIGHT NOTICE

A portion of the disclosure recited in the specification contains material which is subject to copyright protection. Specifically, documents provided with this application include source code instructions for a process by which the present invention is practiced in a computer system. The copyright owner has no objection to the facsimile reproduction of the specification as filed in the Patent and Trademark Office. Otherwise, all copyright rights are reserved.

BACKGROUND OF THE INVENTION

This invention relates in general to computer database processing and more specifically to a system providing for drill-down of associated information among two or more databases.

The ability to efficiently access data is important in many aspects of business, education, entertainment and other types of computer applications. As the volume and type of data increases, providing users with tools to make access, analysis, modification, management and other use of data becomes increasingly important.

One type of database access method is "relational" accessing. In relational accessing, a user can form a query to obtain information from a relational database. The query is written in a specialized language that is typically unique to a particular database type. Different database types, and languages, are provided by, e.g., different manufacturers such as Oracle, International Business Machines (IBM), Microsoft, etc. One characteristic that relational databases provide (even among different types) is the ability to form a query based using keywords and logical operators such as AND, OR and NOT.

A database server receives the query and accesses a data store, accordingly, to obtain the desired information. In a relational type of database, the query results in checking of data records, objects or other data items to determine which data items meet the query definition. Since the checking is done in real-time, and on-demand, the processing burdens placed on database servers can become extremely severe, especially when a database is large, has many relationships among data, and when the query is complex.

A second type of database access method is referred to as On-Line Analytical Processing (OLAP) accessing. In OLAP accessing, data in a relational type of database is pre-processed prior to the time a user performs OLAP accessing. The pre-processing allows an administrator to select different ways to organize the data so that it is more meaningful, and useful, to users of the OLAP interface. For example, an administrator may know that a given business is often interested in reviewing promotional sales of products in different merchandising channels. In this case, the administrator may direct the OLAP system to pre-compute tables, or other collections of data, that include promotions, sales, products and channels, in various arrangements and presentations along with other data.

Once the presentations have been pre-computed, the user can instantly access data of the pre-computed variety in different ways. Thus, OLAP differs from the relational type of accessing because in OLAP the results of a query, or other user access action, do not always require computing presentations, or views, from "raw" data items. The time savings can be enormous, on the order of minutes, hours or days. Another benefit is that an overall database system can operate with many more users since each user's actions result in much less drain on system resources such as processor cycles, memory or storage space, etc.

One drawback to the OLAP approach is that if a user requires a database result that has not been pre-computed then the system must generate the result from items in the relational database. Another is that the size of an OLAP database is exponentially proportional to the number of items it holds data for, frequently making storage of detailed information impractical. The result is that OLAP and Relational technologies are complimentary and there is a strong motivation to allow navigation back and forth, based on the business question that needs answering. However, a problem arises in "mapping" user views of data in OLAP with items of data in a relational database. Often, the higher-level of presentation in an OLAP user interface does not map directly to the base items that were used to generate the OLAP presentation. For example, at the OLAP level the user might view a list of "promotional sales" by "product brands" in 2001. The user may then request to view a list of promotional sales for individual products. The OLAP interface will attempt to fulfill the user's request only to discover that it doesn't store data on individual products The OLAP interface can ask the user to refine the request, can attempt to use default parameters or rules, or take other action to intelligently respond to the user's request. As a user makes increasingly detailed requests for information from OLAP interfaces, the OLAP software must delve deeper and deeper into the data and relationships defined in a relational database from which the OLAP pre-computed presentations were derived. This "delving" deeper into the foundation of the data is referred to as a "drill-down" approach. Ultimately the user may be forced to use relational accessing to obtain the desired information.

Naturally, if the OLAP interface can map higher-level reports, views, or other presentations to relational database information without burdening the user, the more efficient and desirable is the OLAP interface. However, the design of efficient and intuitive interfaces is complicated since today's database applications often use multiple different types of databases among which coherent accessing is desired. For example, there may be multiple relational databases and multiple OLAP databases. Not only do users desire to be able to map, or use drill-down, from any OLAP database to any relational database, but also to map from an OLAP database to another OLAP database; from a relational database to another relational database, or between any different databases, in general. Not only do the number of mapping combinations add to the drill-down demands, but modern systems include databases of different types using different query languages, naming conventions and organizations of data, so that meaningful, accurate, efficient and reliable mappings become extremely difficult—and yet are very desirable and valuable.

Prior art database systems provide drill-through from OLAP to relational by building a metadata model. However, the metadata model only supports OLAP to relational drill-through. Other prior art systems can drill between multiple document types using name matching instead of a metadata map. Still other prior art systems use "relational partitions" as a mechanism to allow OLAP queries to access the relational data under a cube. Unfortunately, regardless of the technology employed these prior art systems are limited in the number of supported drill-through scenarios between OLAP and relational and are unable to provide drill-through from OLAP to OLAP or from relational to OLAP.

BRIEF SUMMARY OF THE INVENTION

The present invention provides a translation, or mapping, from data in an originating database presentation, or in an originating format, to data in a target database presentation, or target format. It also provides a way of capturing and transmitting the context of the original report and the originating data source such that it preserves the organization of the query and variable levels of context "fidelity". The translation uses the context of the originating report in terms of the originating database as a basis for the translation. The originating context is translated to the target context and is used to accurately map data from one presentation to another.

By using context and translation models that defines specifics of the translation between contexts against different data sources, the invention is able to achieve a mapping engine that can efficiently map data between databases of different types that contain independent data using different relationships, naming conventions, structures, presentation models, etc. And that may use diverse ways of presenting information that would otherwise make a mapping very difficult.

A translation map is included in the translation model and uses rules set automatically by the system, or set by a human administrator. The rules permit special treatment of different mapping scenarios. For example, specified types of mappings can be prevented so that irrelevant information or information that can't be mapped are ignored. Member exceptions are used that permit mapping between different data models, as, for example, where values at one level (e.g. Quarter) in an originating data source (e.g. OLAP) need to be mapped to alternate values in another level (e.g. Month) to be translatable in a target data source (e.g. Relational).

The invention intelligently maps between data where implicit, implied, default, or other, qualifiers may be used. Qualifiers provide narrower definitions to the data being viewed and may vary between originating and target data that are the subject of a translation. The invention generates parent translation objects from parent objects corresponding to the qualifiers to assist in mappings where qualifiers are used.

It also provides a way of capturing and transmitting the context of the original report and the originating data source such that it preserves the organization of the query and variable levels of context "fidelity". The translation uses the context of the originating report in terms of the originating database as a basis for the translation. The originating context is translated to the target context (report and data source) and is used to accurately map data from one presentation to another.

By using context and translation models that defines specifics of the translation between contexts against different data sources, the invention is able to achieve a mapping engine that can efficiently map data between databases of different types that contain independent data using different relationships, naming conventions, structures, presentation models, etc.

Other aspects of the invention include using supplemental member translations, translating items in an OLAP level to more than one translation object, delegating data items in cases where there is little or no correspondence between data models, translating a data item to a plurality of data items, translating a data item to a range, and additional aspects.

The invention provides an administrator interface for setting up mapping environments.

Embodiments the invention provides a method for presenting data comprising using a processor to receive signals from a user input device indicating that the user selected the first data in the first context; translating the first context into a second context; using the second context to identify a second data item associated with the first data item; and presenting the second data to the user.

BRIEF DESCRIPTION OF THE DRAWINGS

FIG. 2 illustrates the architecture of the UDS Server environment;

FIG. 3 illustrates a Query Modifier;

DETAILED DESCRIPTION OF THE INVENTION

Figure 1:
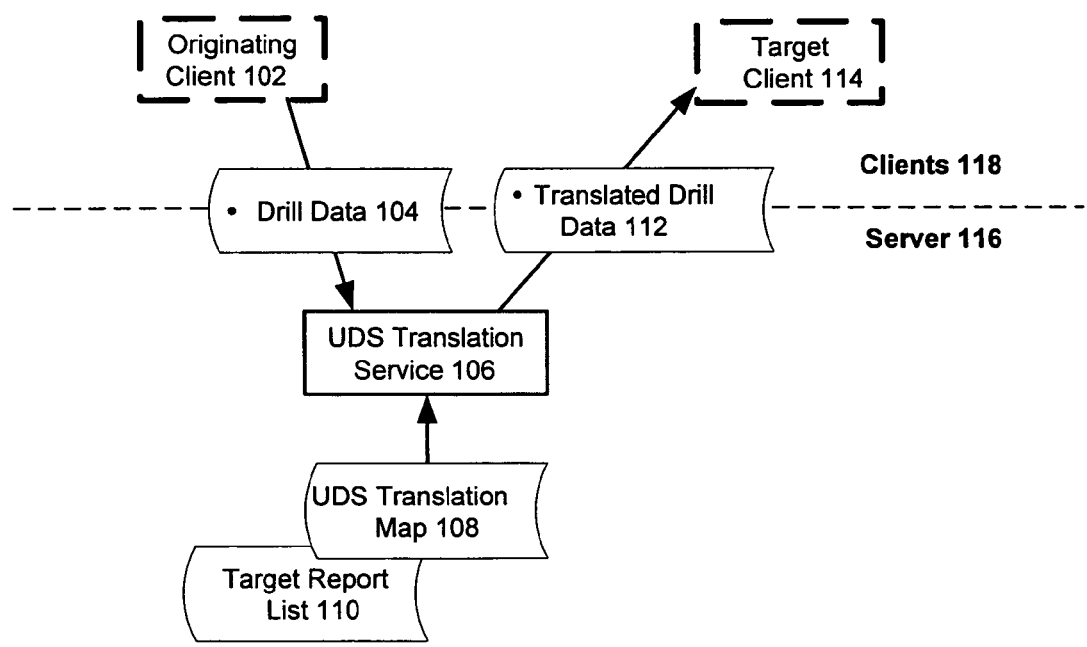
FIG. 1 illustrates the UDS run-time architecture of the present invention.

In the following description of the preferred embodiment, reference is made to the accompanying drawings that form a part hereof, and in which is shown by way of illustration specific embodiments in which the invention may be practiced. It is to be understood that other embodiments may be utilized and that changes may be made without departing from the scope of the present invention.

Definitions

According to the present invention, several terms are introduced relating to field of OLAP and relational databases and an understanding of these terms will be helpful in the appreciation of this invention:

"Business Objects Universe" refers to an abstraction layer that captures and presents a relational or table based database in business terms to a user who is not a database expert. It provides tools to present sometimes obscure names of tables and columns in user based terms, allow reorganization of the database structure in terms closer to the users understanding of the business, plus key metadata that assists the query tools/ clients in building a query (e.g. joins, column data type definitions, building virtual columns and tables that the user understands but that may not exist in the database, etc.). It can also contain pre-built queries, calculation definitions, etc. It is part database map and part repository.

"Client" refers to a client tool in the client/server model. A client tool is one that talks to a database by sending queries (in SQL or MDX query language), receives results and presents them to the user "Context" refers to a perspective or a set of dimensional criteria in a multi-dimensional "slice" or point in the data space of the database that a user is navigating.

"Context transfer" includes the act of migrating a "slice" from one database/tool/report to another so that the user continues to look at different data from the same perspective.

"Drill-through" includes moving from a first data presentation, such as a report, to a second data presentation, such as another report in a different database.

"Drill-down" includes progressing from a first data presentation to a more detailed data presentation by focusing in on information of interest to a user. This can be done, e.g., by accessing information starting with a general category and moving through a hierarchy to obtain specific information relating to the general category.

"Member" denotes any non-numerical or descriptive value from a database. While Member is typically an OLAP or Multi-dimensional database or query term, it is used here to mean any descriptive value in a query or report for OLAP, relational or other data source types. A descriptive value may be an item such as a part number that is numerical in nature but does not indicate a quantity. In contrast, a measure is a value, a "key performance indicator" something measured, while everything else is a member (e.g. Country) or member property (e.g. number of children) that either describes or classifies the subject (e.g. Customer).

"Metadata" includes information required by a client to correctly access and present the data.

"Query tool" includes a software component that translates user understanding of the business question into terms that can be understood by a database and then presents results in terms the user will understand.

"Report" refers to any document or other high level representation of data obtained from a database as a result of a query. A report is the combination of query specification and layout/presentation specification and may include a static snapshot of results from an earlier execution of a report.

"Structure" refers to the framework in which data is stored in a database. In most cases, a database has a hierarchy of frameworks (e.g. server/database/cube/dimension/level) as data can be complex and large.

"Value" denotes any additive or semi-additive numerical or measure value in a report. In case of a cell, a value cell contains a numerical value.

"Member" includes any data (e.g., text or values) that are part of a data organization or presentation, such as a report.

"UDS object models" include models that capture the framework to capture the drilled data and the translation map.

"Universe" includes a series of Object Oriented Objects about relational or table-based databases other than OLAP. A Universe can have several types of objects. Classes, Dimensions, Details and Measures. A Dimension object corresponds to an OLAP Level, a Detail to a Member Property and a Measure is the same as an OLAP Measure. A Class is collection of Dimensions, Details and Measures.

Overview

The present invention supports context transfer between any combination of data sources and originating and target query tool or application by translating, or mapping, from data in an originating format (the "originating report"), to data in a target database presentation, or target format (the "target report"). The Universal Drill-through System (UDS) provides an open, XML-based solution for drill-through between clients and applications. UDS is based a single universal model for drill-through translation, allowing the context from one report to be passed to another report, regardless of the originating and target databases or respective query tools.

UDS enables drilling between reports in the same data source or between a pair of reports such as OLAP/Relational, OLAP/OLAP, Relational/OLAP or Relational/Relational if a drill-through relationship can be established. Drill-through relationships are established if each data source has common values within a structure. The UDS model recognizes that it is possible to map between any two data sources so long as there is a meaningful mapping between the structure/value in one data source to the other.

The UDS model lends itself to as an open standard that is preferably implemented in XML or other open technology. In this manner, third party query tools are readily adapted for generating custom translation maps, for generating a drill-through context and receiving a translated or untranslated drill-through context.

Run-time Architecture

Referring now to FIG. 1, the UDS run-time architecture of the present invention is illustrated. In FIG. 1, a user executes originating client 102 to generate a request drill through. A typical database system is based on a client/server architecture where the majority of data and processing occur at a larger server computer system while multiple users operate smaller client systems to use resources provided by the server. However, the invention can operate in any computer system arrangement including peer-to-peer, standalone, timeshared, application service provider (ASP) or other systems.

"Drill-through," is invoked from within a data presentation such as a report, spreadsheet, listing, etc. A graphical user interface is provided so that the user can select, or highlight, data items on a display screen and then invoke drill-down by selecting, e.g., by clicking with a mouse and pointer, a drill-down button or menu selection. The user is presented with a list of appropriate drill-through target reports. The specific reports that are available for user selection are determined by the translation system from a list of appropriate target report for the combination of originating and target data sources. The process and data are represented as drill data package 104. The system places restrictions on the type of data to which the user can drill-through, depending on settings by a system administrator, discussed below and in the accompanying documents.

Processes included in the client computer platform, or working in, or with, the data package determine the context in which the user drill-through request has been made. For example, if the user is viewing statistics for a specific year and corporate division when the user requests to drill-through on sales volumes being displayed, the context of the request includes the relevant year and corporate division. Other considerations implicating context include the use of qualifiers that may be implied, implicit, known by default, etc. Also, concepts such as compounded interest, etc., may be used at the originating client to present information to the user in a way that is easy for the user to understand. Such concepts may require additional data from the client to characterize the concept in sufficient detail for drill-through. Additional embodiments can support other concepts such as "year to date," etc.

The extracted context is passed along with the target report. Metadata about the report includes, for example, a unique name or identifier, location of the originating client, originating and target data sources and associated rules. The data package is then passed to translation service 106. In a preferred embodiment, the data package is passed as an extended markup language (XML) stream. Translation service 106 translates from the extracted context into the context for the target data source. The translation service uses translation map 108 (and other parts of a context model and translation model, as needed) and target report list 110 to perform the translation.

Translated drill data 112, including translated context information, is passed to target client 114. Target client 114 applies the translated context according to context application rules residing on the target client platform, or provided with the translated drill data package. The target report may be a pre-authored report that is modified by the drill context or one that is created dynamically. Alternatively, the target report may be a combination of both.

One preferred embodiment of the invention uses existing query tools and reports at the originating and client targets. Although the illustration discusses the originating and client targets as user computers, they can also be database systems that use multiple computers to support many users. The size and configuration of the originating and target clients can vary widely to include any type of processing system.

The translation process is essentially transparent to the user who is not concerned with the steps of translation or where the target data resides or the nature of the target client system. The translation process is designed to impose few, or no, restrictions on the user's ability to view and use the originating report and target reports.

The translation process uses a context model and a translation model, both of which are described in detail in the accompanying documents. The context model includes data structure and value information. It also includes the format, or structure, of the query. In a preferred embodiment, the context model is a multi-axis query specification that is preserved during translation. This enables the target query tool to build an equivalent report using data from the target data source.

In operation, the process for the user is simple. The user first selects the drill through context by pointing and clicking at the data and values of interest in an originating report. This typically consists of picking one or more cell values or members in an originating report and activating the drill through option. The context may be data relating to a particular product, such as fishing lures, or relating to a range of dates, such as the amount of sales in the first quarter of the year 1999. The user is then presented with a list of drill-through target reports valid for the context scope within the originating data source from which the user merely selects one or more reports and executes a drill-through command to obtain the target report(s). Determination of whether a report is valid depends on several factors, such as available reports, the scope that the target report is valid for and governors (or rules) that define what the user is allowed to drill-through to.

Once the user selects a target report, extraction rules are applied to extract the context. Extracted context is passed along with the target report and metadata about the report. The metadata about the report includes, by way of example, the unique name, location, originating and target data sources and associated rules. This package is then passed back to the UDS Translation Service module 106. The preferred route is as an XML stream.

UDS translation service module 106 translates from the extracted context into an equivalent translated drill data 104 for the target client 114 (or target data source). The drill data 104 is passed from the server environment 116 to the client environment 118, again preferably as an XML stream.

The translated drill context is passed to the target client tool, which applies the translated context, according to context application rules. The target report may be a pre-authored report that is modified by the drill context or can be dynamically created.

Because UDS uses existing query tools and reports as the starting and end-points, the user perceives UDS as a transparent bridge between the originating and target reports and the tools that are used to present them. Advantageously, UDS imposes no restrictions on what can be done in the originating report and does not restrict what can be done with the target report after completion of a drill-through transaction. The changes that have been applied have used the query specification of the target report tool, so the target report is in no way different than if the user had created the report using the user interface of the target client query tools.

The UDS server environment 116 is responsible for handling the drill-through transaction sent by the client that implements the drill-through feature. The workflow, associated with the UDS Server, includes listening from a socket port for an incoming transaction. When a transaction is received, the UDS server handles it by dispatching the transaction to the UDS translation service 106. When a transaction is terminated, a result is sent back on the socket to target client 114.

FIG. 2 illustrates the architecture of the UDS Server environment 116. In one preferred embodiment, the UDS Server environment 116 is a Windows NT Service that handles transactions received by listening from a socket for incoming transactions. UDS Server environment 116 includes an executable module, DTS.EXE 202 that contains the infrastructure for the NT Service, to listen for incoming transactions, to dispatch the incoming transaction to the right sub-components. UDS Server environment 116 further includes executable routines, DocManager.DLL 204, which manages the translation maps and performs some retrieval actions, and Translator.DLL 206, which performs the translation by using the translation maps.

Although not specific to UDS Server environment 116, a executable routine, DTSModels.DLL 208 is used to access UDS object models, which are used to create the NT Service. Another executable routine, XMLModlule.DLL 210, contains the XML serialization engine used by the UDS object models to generate the XML stream. The executable routine Xerces-c_1_5.DLL 212 contains a XML parser used by the XML serialization engine.

Client Tools

Any client tool having the drill-through feature must include a Drill-Through Extractor (DTE), a Query Modifier and be able to call the UDS Server using the UDS Proxy (DTSProxy.DLL or COMUDSProxy.DLL).

Drill-Through Extractor (DTE)

The Drill-Through Extractor extracts the current context from the report to populate the drilled data object model. The extracted context defines the input required for the UDS Server to perform the translation of the data from the data source used by the originating document to the data source used by the target document. The manner in which the context is extracted is defined by specific rules that are specific to the client tool itself.

Query Modifier

FIG. 3 illustrates the Query Modifier, which defines the manner a document is updated with information contained in drilled data object model received. The Query Modifiers are the components used to update, from the translated Drilled Data OM information provided, the query of a existing document: WebI document, WebI OLAP document, etc. One specific Query Modifier exists for each document types and the target document for a client tool must define the Query Modifier. The Query Modifier includes executable routine QueryModifier.DLL 302, which is the common layer that receives all requests and dispatches each request to a corresponding specific query modifier. It is responsible for dispatching tasks to the correct query modifier.

Existing specific query modifiers include the WebI query modifier 304 and the WebI OLAP modifier 306 which are necessary to modify the target query and make it compatible with the respective target data source. This component contains the COM interface 318, which is used to send transaction to the Query Modifier. These components validate the content of the transaction and dispatches the transaction to the right query modifier, i.e. the query modifier is able to deal with the type of document defined in the transaction, such as WebI or Essbase. The WebI Query Modifier includes executable routine QM_WebI.DLL. WebI OLAP modifier 306 identifies whether the query is related to an OLAP database or an Essbase database by selectively interfacing with OLAP query engine 314 and Essbase query engine 316 as necessary to perform the transaction.

The Query Modifier also uses several executable routines on a non-exclusive basis. Specifically, a dynamic linked library, DTSModels.DLL 308, contains the UDS Object Models. A dynamic linked library, XMLModlule.DLL 310, contains the XML serialization engine used by the UDS object models. A dynamic linked library, Xerces-c_1_5.DLL 312, contains the XML parser used by the XML serialization. The workflows to use the query modifier performs the following sequence: 1) Create a instance of the "DrillThru" class; 2) Call the "SetInfo( )" or SetInfoWithConnection( )." The method will internally initialize the query modifier by creating the drilled data object model from the received XML and setting the internal attributes. This method will also reinitialize the context of the query modifier with the new one. Call any of the following methods if required to retrieve some information about the current query modifier context (in any order):

1) GetRDBMSVendor( )
2) GetRDBMSVendor( )
3) AuthentificationIsEmpty( )
4) Call the right method to retrieve the updated document with the information provided:
5) GetURLDocument( )
6) GetArizonaDocument( )

The following code sample is an example of how the query modifier can be used from VB code:

```
QM.SetInfo(XML, SessionID, WebIServerName);
url = QM.GetURLDocument( );
```

Example of one implementation of the drill-through:

```
QM.SetInfo(XML, SessionID, WebIServerName, User, Password);
If QM.GetRDBMSVendo( ) == "Essbase" &&
QM.AuthentificationIsEmpty( )
    Doc = QM.GetDocumentName( )
    // Exit and Prompt the user for login info...
    // Re-execute this procedure after...
```

Else

```
If QM.GetRDBMSVendo( ) == "MSOLAP" ||
QM.GetRDBMSVendo( ) == "Essbase"
    Doc = QM.GetArizonaDocument( );
    // If throw error –2, can prompt the user for new user & password.
    // Exit and Prompt the user for login info...
    // Re-execute this procedure after...
Else
    url = QM.GetURLDocument( );
```

Figure 4:
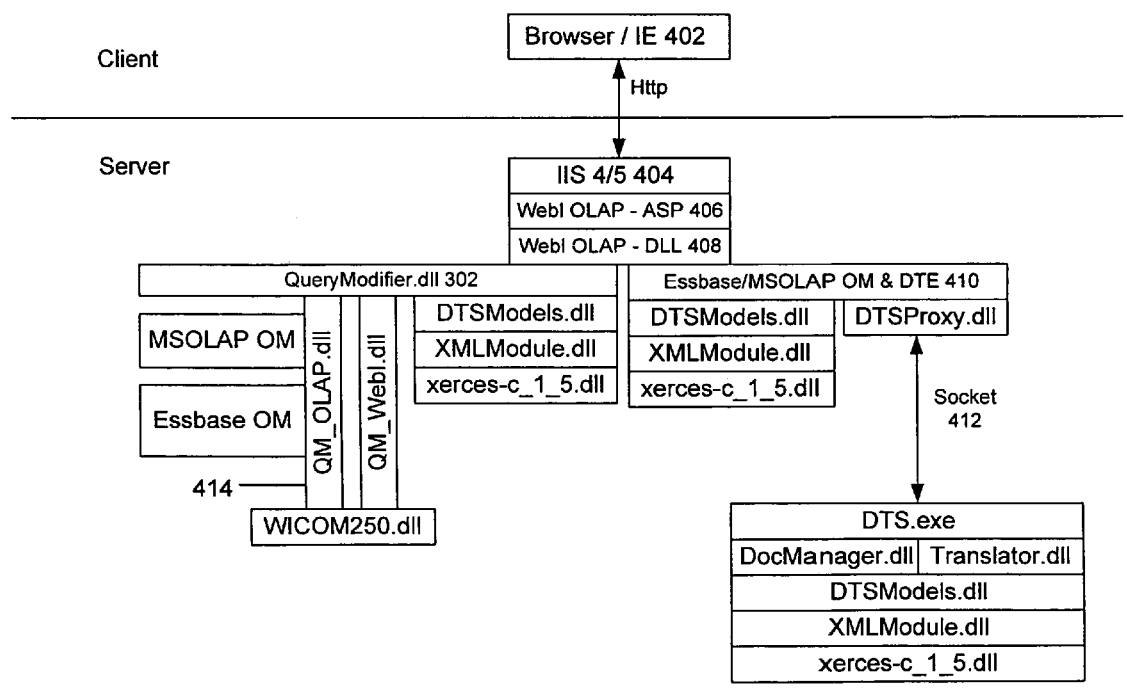
FIG. 4 illustrates the architectural components of a WebI OLAP Query Modifier.

FIG. 4 illustrates the architectural components of the WebI OLAP Query Modifier, which includes a dynamic linked library, QM_OLAP.DLL. The WebI OLAP implementation uses a browser 402 or Internet Explorer, which is available from Microsoft Corporation. Browser 402 is used to display WebI OLAP documents in the client environment 118.

In the server environment, Microsoft's Web hosting platform marketed as the Internet Information Services (IIS 4/5) 404 is used as the web server. An Active Server Pages (ASP) script 406 handles requests from the WebI OLAP process through the WebI OLAP-DLL dynamic linked library 408.

The OLAP object model used by WebI OLAP is Essbase/MSOLAP OM & DTE 410 with an added drill-through extractor. Essbase/MSOLAP OM & DTE 410 also handles the transaction with the UDS Server through socket 412. The specific Query Modifier for the WebI OLAP document is the executable routine, QM_OLAP.DLL 414.

The workflow associated with FIG. 4 begins from the browser 402 when the user selects a cell inside a WebI OLAP document. Using browser 402, the user selects a "drill through icon" in the toolbar (not shown). In response to the user's selection, browser 402 sends the request to the web server 404 to retrieve the available target documents, if any.

Upon receipt, web server 404 launches the requested ASP script 406 (WebI OLAP—ASP) that then calls the WebI OLAP DLL 408. The WebI OLAP DLL 408 calls the OLAP object model 410 to retrieve the target documents.

The OLAP object model 410 extracts the current data source information and calls the UDS Server 200 with the current data source information for retrieving the target documents. UDS Server 200 retrieves and returns the target documents to the OLAP object model 410. The OLAP object model 410 then returns the received target documents to the WebI OLAP DLL 408. WebI OLAP DLL 408 builds and returns a new HTML page based on the received target document. Upon receipt, browser 402 displays the list of target documents.

From browser 402, the user selects one document from the list of target documents. Browser sends this request to web server 404 to retrieve the target document. Upon receipt, web server 404 launches the requested ASP script, such as WebI OLAP—ASP 406, that calls the WebI OLAP DLL 408. The WebI OLAP DLL 408 then calls the OLAP object model 410 to retrieve the translated drilled data. The OLAP objects model 410 extracts the current drill context and populates a drilled data object model.

The OLAP object model 410 calls UDS Server 200 with the drilled data information to retrieve the translated one for the selected document. UDS Server 200 performs the translation and returns translated drilled data information to the OLAP object model 410. In turn, the OLAP object model 410 returns the received drilled data information to the WebI OLAP DLL 408.

Then the WebI OLAP DLL 408 calls Query Modifier 302 with the received drilled data. Query Modifier 302 returns a reference to the updated document from which the WebI OLAP DLL 408 builds and returns the new HTML page or returns the URL to the document. Browser 402 then displays the updated document.

Off-line Architecture

Figure 5:
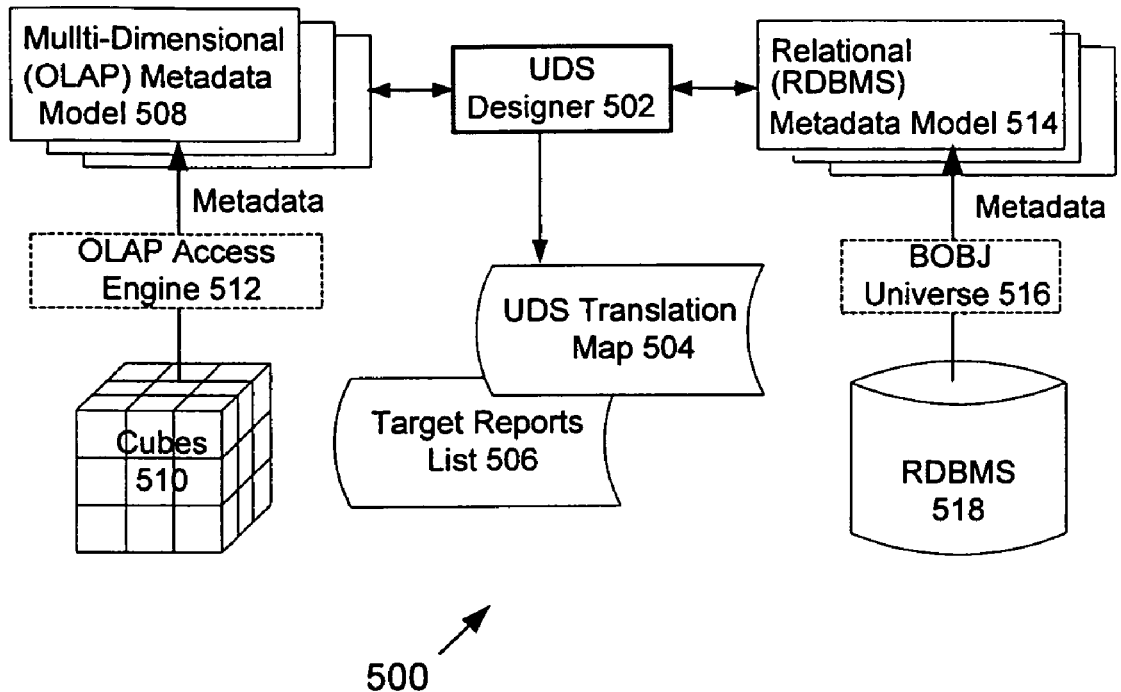
FIG. 5 illustrates the off-line UDS designer architecture.

Referring now to FIG. 5, the off-line UDS designer architecture 500 is illustrated. The UDS designer 502 is used off-line to build translation maps 504 and identify target list reports 506, which are then available to all users. However, it is to be understood, that in alternative embodiments, the UDS Designer may be invoked as a real-time process.

UDS designer 502 retrieves metadata to populate the translation maps 504 and includes the capability to use selected application program interfaces (APIs) to access cube and relational metadata and to provide the originating and target data source metadata. The designer 502 acquires OLAP metadata from metadata model 508. Model 508 acquires data from OLAP cube 510 through requests handled by access engine 512 in a manner understood in the art. Likewise, relational metadata is acquired from metadata model 514, BOBJ Universe engine 516 and relational database 518. Designer 502 also provides a drag and drop user interface that allows users to readily build translation map for each originating or target source. It still further enables assignment of drill-through target reports to the translation map.

Figure 6:
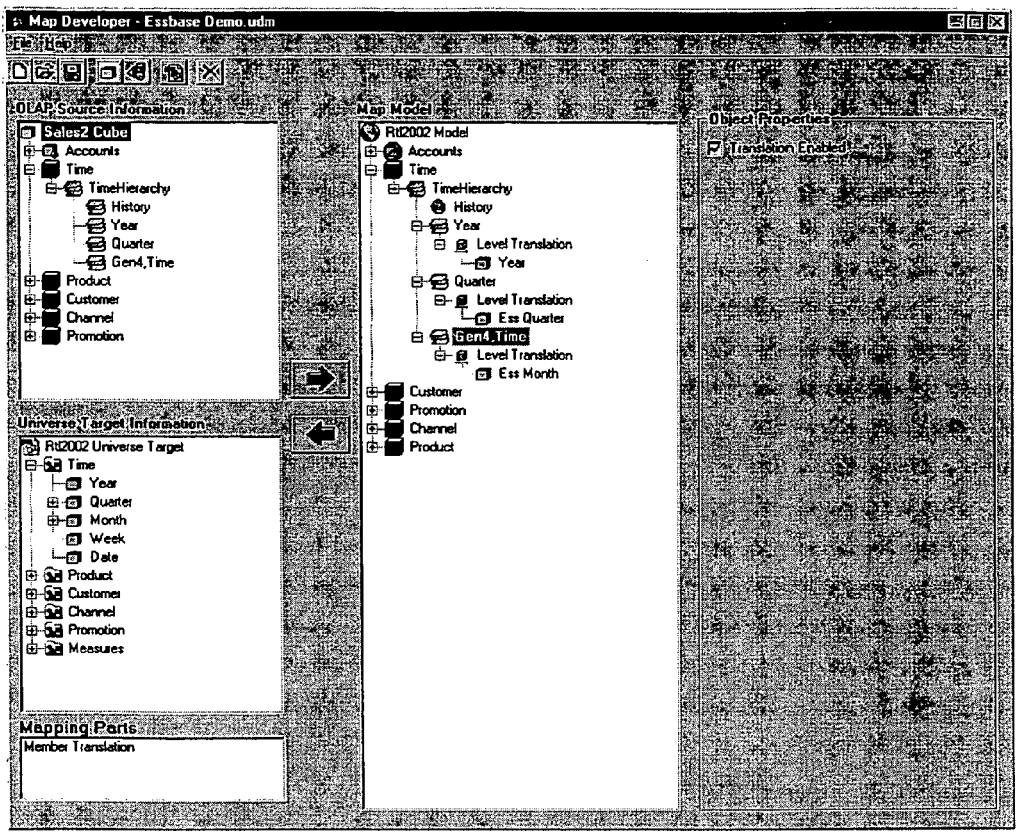
FIG. 6 illustrates a screen snap shot that shows an actual working translation model.

FIG. 6 illustrates a screen snap shot that shows an actual working translation model open for modification with the OLAP (cube) originating data source in the top left pane and the relational (Universe) data source in the middle left pane and the drill-through components in the bottom left pane.

UDS Designer

Figure 7:
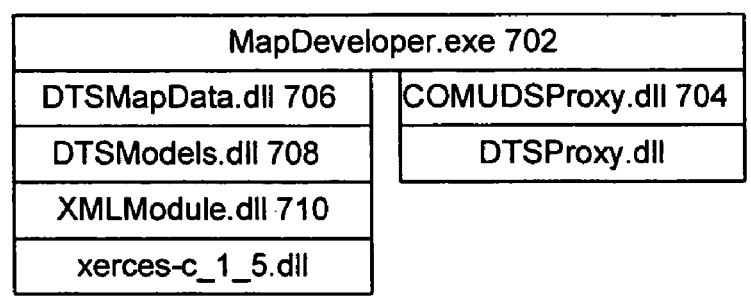
FIG. 7 illustrates a MapDeveloper module of the UDS Designer.

The UDS Designer creates the translation maps used by the UDS Server. In one preferred embodiment, the UDS Designer is written in Visual Basic (VB), which is available from Microsoft Corporation, on top of a UDS SDK. As illustrated in FIG. 7, the UDS Designer includes an executable module MapDeveloper.exe. The user interface portion of the module is preferably written in VB. The module uses UDS SDK components, described below, to build the translation maps.

The UDS Designer includes executable routines, COMUDSProxy.DLL, which is a UDS SDK component used to send transactions to the UDS Server, and DTSMapData.DLL, which is a UDS SDK component used to manipulate the translation map object model.

Additional components are not specific to the UDS Designer, but are used by it. Specifically, executable routine, DTSModels.DLL, contains the UDS Object Models. Executable routine, XMLModlule.DLL, contains the XML serialization engine used by the UDS object models. The XML serialization engine is a sub-component used by some drill-through components to provide a generic XML serialization for any object model. It provides the ability to create a C++ object model in memory from a XML document (file or stream in memory) as well as the ability to create a XML document (file or stream in memory) from a C++ object model in memory. Executable routine, Xerces-c_1_5.DLL, contains the XML parser used by the XML serialization. Executable routine, DTSProxy.dll, which is a C++ implementation of COMUDSProxy.DLL.

UDS SDK

Figure 8:
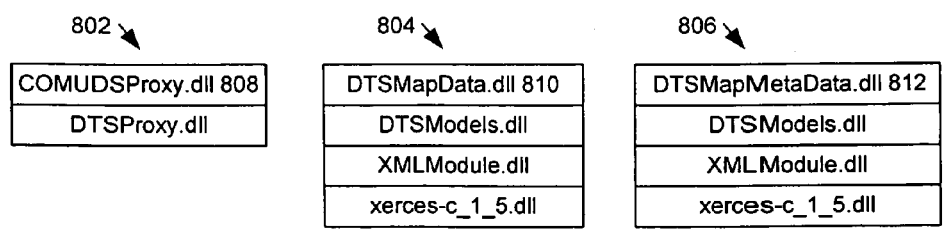
FIG. 8 illustrates the UDS SDK architecture including three COM components.

The UDS SDK provides a COM wrapper on top of the UDS Object Model. FIG. 8 illustrates the UDS SDK architecture that includes three COM components. The executable routine, COMUDSProxy.DLL, is a COM SDK component that is used to send transactions to the UDS Server. The executable routine, DTSMapData.DLL is the COM SDK component that is used to manipulate the translation maps object model. The executable routine, DTSMapMetaData.DLL, is the COM SDK component that is used to manipulate the drilled data object model.

Additional components are not specific to the UDS SDK, but used by it. Specifically, the executable routine, DTSModels.DLL, contains the UDS Object Models. The executable routine, XMLModlule.DLL, contains the XML serialization engine used by the UDS object models. The executable routine, Xerces-c_1_5.DLL, contains the XML parser used by the XML serialization. The executable routine, DTSProxy.dll, is a C++ implementation of the COMUDSProxy.DLL.

Context Map Models

The transfer of report context between any two queries/reports for any two query/report tools and any two data sources requires a drill-context capture model that correctly captures the semantics of simple and complex (multiple members, value cells) contexts and when translated to a different data source preserves the context so it can be correctly applied. As used herein, a simple context is a single member or a single value while complex contexts consist of multiple members or value cells.

The drill-context capture model must capture the visible context for members on rows and columns in the report as well as the context for members and hidden context from filters and other axes for OLAP queries.

The drill-capture model must be flexible enough to allow the application of a drill-context to an existing target report or the automatic generation of a target query against the target data source. It must ensure that the drill-context extraction from the originating report and application of the drill-context to the target report do not change the behavior or options of the query/report tool or the report. The context transfer must be strictly function as a bridge, with no side affects or unintended distortion.

The basic tasks in a drill-through process are: 1) context selection, which is the process of selecting the context to drill-through from in a report; 2) context extraction, which provides the ability to extract both visible and hidden context; 3) context capture, which is the process of modeling the context; 4) context translation of the context from one data source to another; and 5) context application, which is the process of applying the context to the target report or data source.

Context Selection

Figure 9:
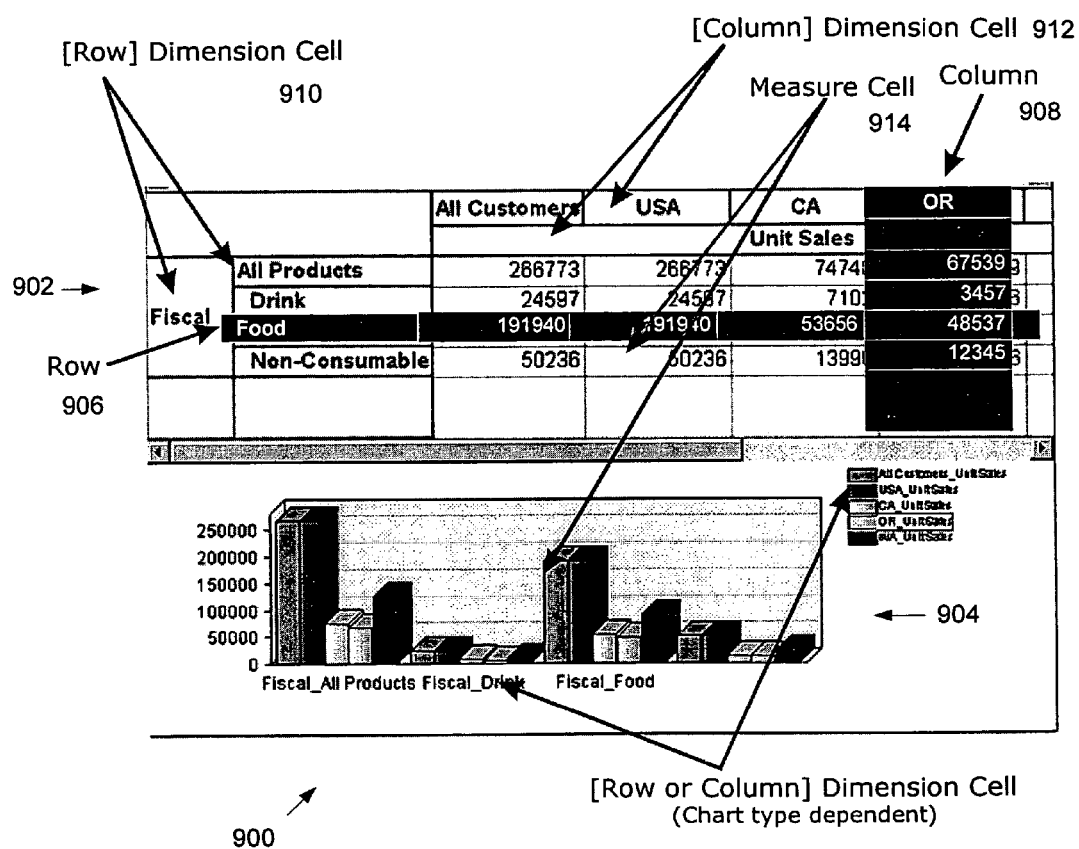
FIG. 9 shows a report with table data and a bar graph.

Refer now to FIG. 9, which illustrates an example of a report 900 having table data 902 in the top half of the screen and a bar graph 904 of the data in the lower portion of the screen. The table comprises a plurality of rows, such as indicated at 906, and columns such as indicated at 908. Row and column dimension cells 910 and 912, respectively, are the business entities that appear on the row and column headings of a query result cells. Measure cells 914, formed by the intersection of a column and a row, display values.

The user is able to select single or multiple cells, or rows or columns in the spreadsheet. The user can also, similarly, select labels, bars or other items from visual presentations of data such as the bar chart at the bottom of FIG. 9. Users need to be able to easily select context within report 900 regardless of the selection. The selected context may comprise a single member (e.g. Product=Food) as shown at row 906. Alternatively, the selected context may comprise a value cell for which the context is passed based on the report type. For example, where report type is a list style report the selected context is passed based on the members for all the columns of the selected row. Report types may also be a cross tab style report. In the cross tab style report, the context for the members of all the nested structures for the row and column axis of the report would be selected. For the value cell 48537 in FIG. 9, the members would include Unit Sales (Measure Dimension on Column Axis), OR (Customer Dimension on the Column Axis), Food (Product Dimension, Row Axis) and Fiscal (Time Dimension, Row Axis).

It will be appreciated that the selected context may comprise any combination of value cells and members via multi-select, row select, column select and the like. In addition to direct selection of drill context on the report, there is an implied selection of context for parts of the report or query that are not displayed directly in the report. For relational reports, this includes values for columns in the conditions for the report and for OLAP reports this includes filter, page and other axes.

Context Extraction

Context is defined in terms of the descriptive values and the members of the selected cell or member. Context may also include the list of which measure members (sales, costs, etc.) are included in the report. It is generally not useful to pass the actual measure values such as sales=$2,190,000.

Once the user has selected the context they wish to drill-through on, the query tool is required to correctly extract the context. Thus, the query tool must extract the members and all qualifying information about the members. By way of example, when the selected member is "time.month=March" it is necessary to fully qualify the month by specifying the relevant year (time.year=2001). When the user has drilled on multiple cells, the context for each drilled cell needs to be captured independently in order to preserve context.

The query tool must also extract members from simple (Country=France) and complex (Top 10 Countries for Unit Sales) expressions for dimensions/columns used in the originating query/report's filter (for relational or filter, page axis for OLAP). The context must include the structure of the query to allow the context to be correctly applied to the target and/or to allow construction of an equivalent query against a target data source.

Context Capture

In order to achieve drill-through capabilities, the drill-context must be of the form of a data source and client tool agnostic query specification. The drill-context must also identify the drilled data in such a way that a drill-through can take place where the same data source is used by the originating and target reports. In this instance, the drill-context does not need to be translated and only one drill context model is required because there is no required translation between an input version and an output version. The drill-context must translate drilled members (metadata) to correctly combine logical operators (such as, by way of examples, ANDs and ORs must be correctly positioned) to provide the semantically equivalent context when drilling through to a target report.

It is important that the drilled metadata is captured such that an equivalent query can be constructed in the target data source. This requires that the context include sufficient metadata to fully qualify a member in one data source so it can be unambiguously identified in the target data source.

The structure must also be capable of capturing drill-context at varying levels of detail. The capture is a straightforward capture of the context of a single member (e.g. Time.Year=1997). However, the structure must be sufficiently robust to capture the drill-context for all members that support an intersecting value cell. For a two-axis report, in a cross tab style report, the drill context for members along both rows and columns with the value cells providing the result for the intersection. This requires that all the members of all the nested dimensions or relational columns for the row and column axis of the report be included as part of the capture. For a one-axis report in a list-style report is a degenerate case of a two-axis report, which is commonly known alternatively either as a list style or column-only report. In a one-axis report, selecting a value cell is effectively selecting all the members on the same row. When the report includes other axes, descriptive values on each other axes in the report that are common across the value and descriptive cells displayed for the report must be captured. For relational reports, this means including descriptive values in the conditions ("where" clause) for the report, which is equivalent to the filter axis. For OLAP reports, other axes include the filter and page by way of example.

Context Translation

All databases are data sources that are based on structures that contain descriptive and measure data. If equivalent data structures in two data sources can be found then a mapping can be defined between a value in an originating data source and one or more values in a target data source and a translation mapping can be defined.

The translation map provides metadata that is parsed to translate members from data source structures in the originating to the equivalent structures/members in the target data source. By way of example, from OLAP to Relational the equivalent structures/members consists chiefly of mapping Members from Dimension Levels to equivalent Members in Table Columns. Typically, there is no need to translate to or from OLAP Member Properties (SQL Server Analysis Services term, equivalent for Essbase is an Attribute). However, if Member Properties are exposed in Virtual (Attribute) dimensions then they may be mapped as dimension levels. Otherwise, filtering by Member Properties is merely an alternative way of specifying members for the dimension they are associated with. If the members (for the Dimension Level)

that result from the filter are translated, then the context has been correctly captured. Preferably, the translation map supports enabling and disabling translation at a structure (OLAP—Dimension, Hierarchy, Level, Relational—Table, Column) or member level. When the translation map is combined with the drill-context from the originating report or data source, the necessary metadata to enable translation to the target data source is available. The metadata is also used to determine if a translation map is out of sync with the originating data source. In this manner, it is possible to support all different combinations of originating and target data source types within a single model. The adaptable nature of the present model enables support of a wide variety of data sources other than OLAP or Relational because the model supports development of common mapping scenarios between data sources.

Context Application

Using the drill-context, it is possible to extract the context in a semantically correct manner for the target data source. When and where to combine the context using AND and OR semantics must be implicitly or directly specified. There must be a default set of rules for building or modifying a target report. It must be possible to extend the model to allow optional "context application" rules to override the defaults. It must be possible to modify or build the target report without constraint. There should be no difference compared with a user directly modifying the report manually.

Components

There are requirements for the drill through system and how it interacts with external systems. Specifically, the translation map and drill context models must be a separate entity from the data source because it must be possible to change the map independently. The translation map and drill context models must be open and available to be directly read and written by any third party query tool, which is a requirement to support UDS as an open service. In order to support the drill context model being compatible with third party tools, it is the responsibility of the originating query tool to provide the context selection mechanisms to the user, perform the extraction of the context and to populate the drill context model. The target query tool is responsible for extracting the context from the drill context model and modifying an existing target report or to build a new target report. Either the UDS system or external tools can provide a list of appropriate target reports, plus options on the rules for context extraction and application. The UDS system must be able to accept a drill context from any tool and to transfer a drill context to any tool (e.g. via a URL, SOAP or RPC call).

Implementation

The core of the UDS system is the context and translation map models and the translation algorithm that in combination satisfy all of the requirement to enable universal translation between any two data sources that have structures and values that can be unambiguously mapped to each other with 1:1 through M:N basis.

The Context (Drill Metadata) Model

Figure 10:
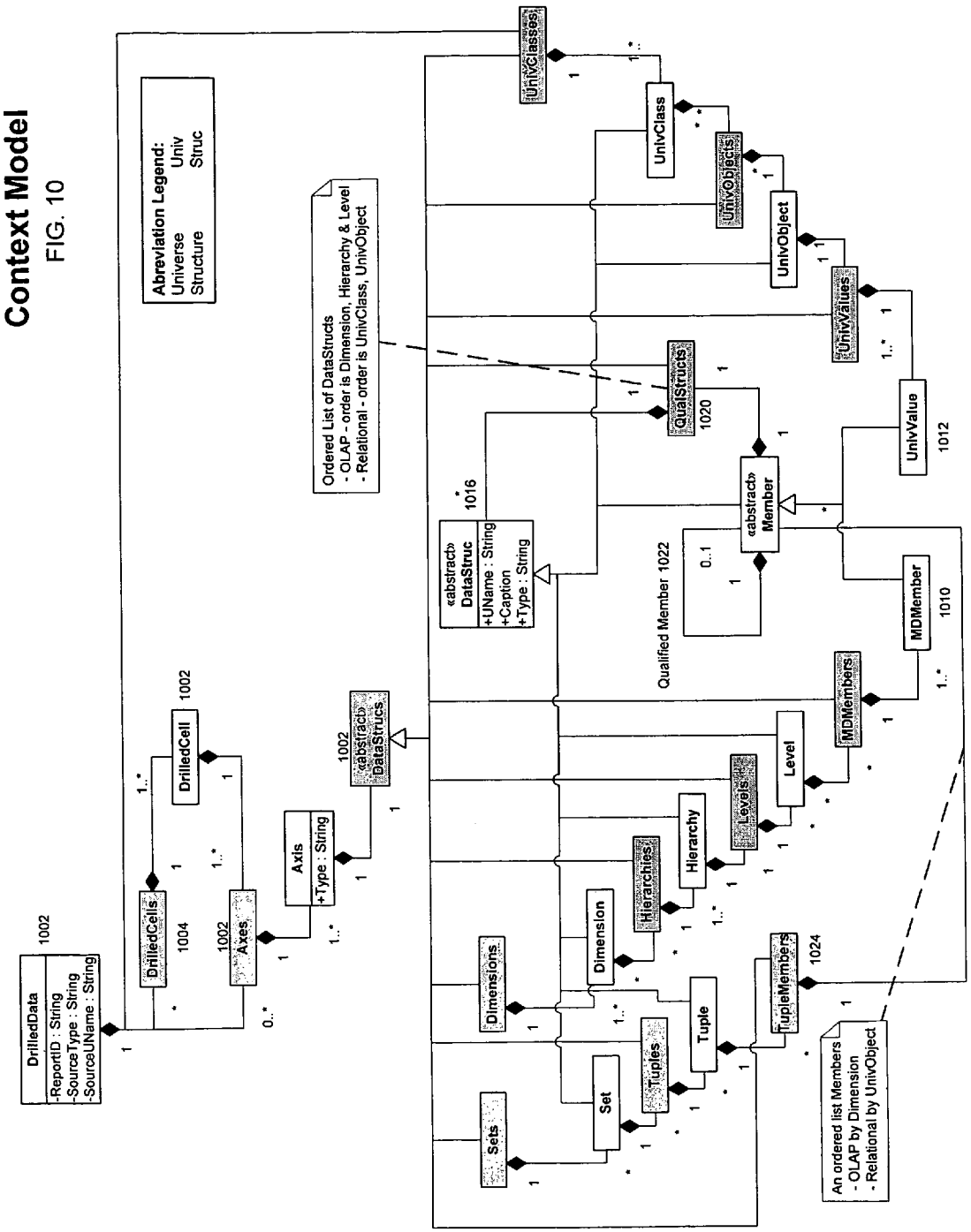
FIG. 10 illustrates a context model.

Referring to FIG. 10, a context model is illustrated. The context model captures both the data and metadata from the drill operation specified by the user. At the top level of the model, a DrilledData object 1002 contains a collection of DrilledCells 1004 and 106 and Axes 1008. A DrilledCell comprises a collection of the members associated with the each cell that the user selected to drill through on in the originating report. This can be as simple as a single member cell (for example, time.year=1997) or as complex as all the members on the row and column axes that intersect at a selected value cell in a crosstab report. As in the originating query, the members associated with each drilled cell are grouped by axis.

Both OLAP and relational queries may have members essential to the context not directly visible in the report presented to the user. For a relational query, these are members in filter conditions. For OLAP, dimensions and members can exist on the filter, page or other axes. As members from these "hidden" axes are common for any and all visibly drilled cells on the report, they are grouped by axes where axis objects are an ordered list within the Axes collection to preserve the order that members appear in the query. For example, a drill-context for a crosstab report that includes two drilled cells, plus members on the filter and page axis, would result in a drill-context with two drilled cell objects, each with members on the row and column axis plus common members from a filter and page axis.

The members are captured according to the data structures of the originating data source. In the case of an OLAP source, the members are MDMembers, which are organized by Dimension, Hierarchy and Level such as indicated generally at 1010. When drilling from a Relational source, members are UnivValues they are organized by UnivClass (Universe Class) and UnivObject (Universe Object) as indicated generally at 1012. These classes and collections inherit from abstract classes Member, DataStruc 1014 and DataStrucs 1016.

For arbitrarily complex filters for both relational and OLAP queries, it is possible to capture complex combinations of members within a set of tuples (that is, a set of related values for each attribute). To translate members and to minimize the errors, the metadata must include the unique name of the member within the data source, optionally the caption and the type. For Essbase data sources, the name itself must be unique, for MS OLAP, the name will include the path with only the full path including the name having to be unique.

Metadata must also include the qualifying structure, QualtStructs 1020, to describe the data structure that the member belongs to. In the case of an OLAP member, this is the dimension, hierarchy and level of the member. For each qualifying structure, the unique name, caption and type must be a part of the metadata.

Metadata must also include the member as qualifying member(s) 1022 because, in many cases, just translating the member alone is ambiguous. For example, drilling through on "March" requires the Year in order to be fully qualified. Drilled Members are always captured with their qualifying (parent) members. By way of example, consider the selection of a customer dimension that has levels for Country, State/Prov, City and Customer. To fully qualify an individual Customer (e.g. John Smith), the qualifying members for each of the parent levels are required (e.g. Country=Canada, Sate/Prov=Ontario, City=Toronto). While this is an OLAP/Multi-dimensional example, the same is a requirement for relational sources. Thus, the task of context extraction for relational query tools is somewhat more complex but can be implemented with knowledge of the structure. The context model is essentially a multi-axis query specification. As this structure is preserved during the translation, it enables the target query tool to build the equivalent report against the target data source. Ideally, the user does not realize that a different query tools or data sources is generating the presentation of the drilled-through data.

The structure of the model also provides implicit rules on how to apply the context data. Specifically, for a relational target data source, drilled cell conditions are ORed; different Universe Objects are ANDed; and multiple Universe Values for a single Universe Object are ORed. For an OLAP target data source, the members within a drilled cell are formed into a tuple and multiple drilled cells form a set of tuples, as indicated generally at 1024. For members that are on the filter, page or any axis other than row or column, members are just added to each dimension as individual members.

Context Application Algorithm

How a context is actually applied to a target report is dependant upon the target query/reporting tool. In one embodiment, the default is to build a condition based on the rules, as outlined above, and append this condition to the filter for the relational query. More complex modification instructions are possible and can be associated with a target report metadata that may include replacing the entire condition for an existing query or assigning rules on how to build a new target report or how to replace columns in the report based on the context metadata.

Translation Model

Figure 11:
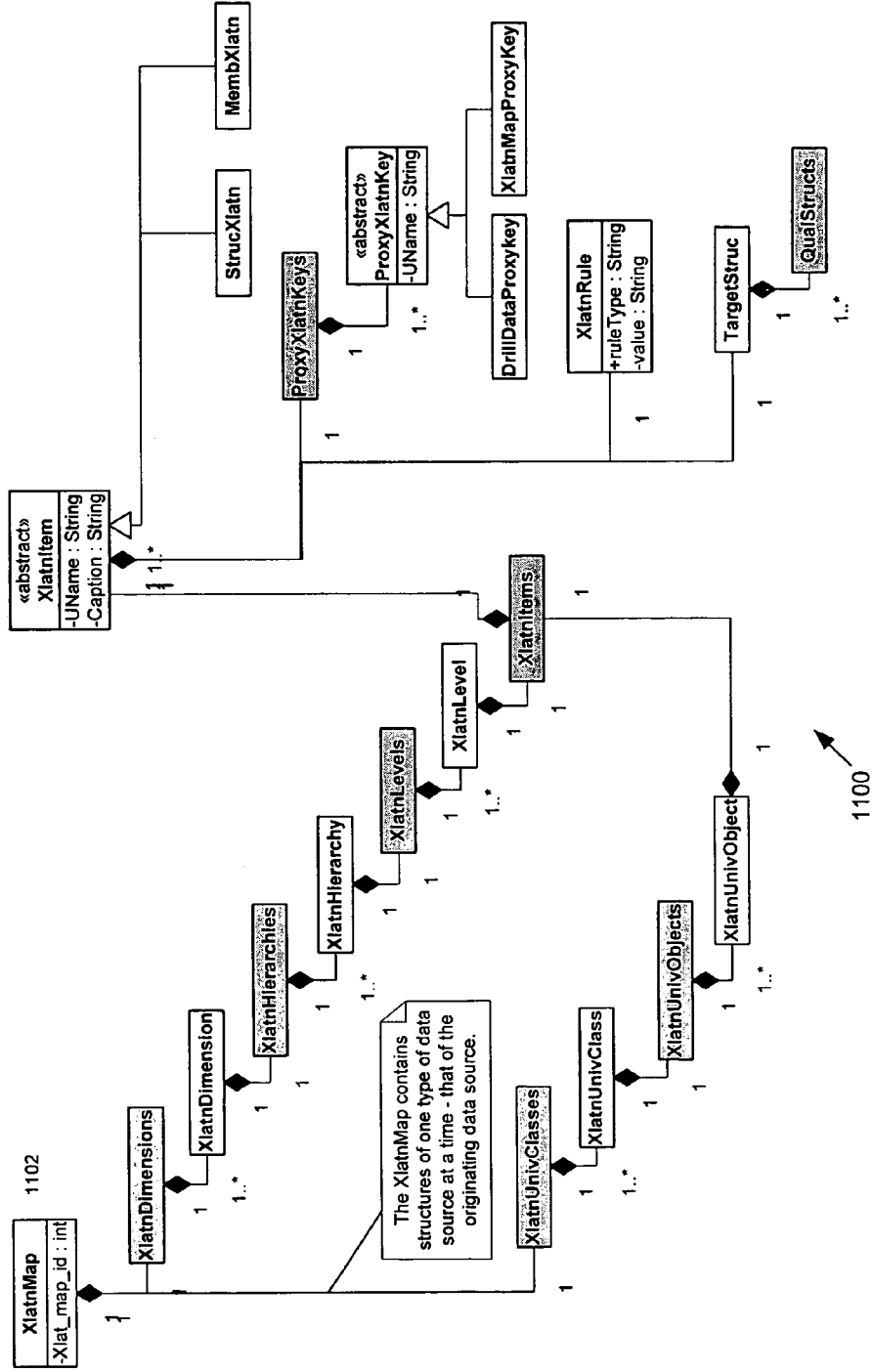
FIG. 11 illustrates a translation map model.

FIG. 11 illustrates the translation map model 1100. Translation map model 1100 contains metadata, that when combined with the metadata and data from the context model can translate a context model from one data source to another. XlatnMap 1102 uses the structure of the originating data source to organize the translation map. For an OLAP data source, this is the dimension, hierarchy, level structure—XlatnDimensions 1104, XlatnDimension 1106, XlatnHierarchies 1108, XlatnHierarchy 1110, XlatnLevels 1112 and XlatnLevel 1114. For a relational data source, this is XlatnUnivClasses 1116, XlatnUnivClass 1118, XlatnUnivObjects 1120 and XlatnUnivObject 1122. The objects being translated are the members from context model 1000.

Members are associated with levels for OLAP and UnivObjects for Relational data sources. How a member is translated is controlled by the collection of translation items (XlatnItems 1124). The types and organization of the translation items is dictated by satisfying all the possible translation scenarios. Further, there are two sub-types of the translation items known as the structure translation (StrucXlatn 1126) and member translation (MembXlatn 1128).

Structure Translation provides the metadata on the target data source structure that the originating member will be mapped to and the associated rules. These are the TargetStruc 1130 and XlatnRule 1132 objects.

TargetStruc 1130 contains a collection of Qualifying Structures (QualStructs) where the type of qualifying structures is dependent on the data source target (OLAP or Relational). XlatnRule 1134 contains the ruleType and the value that contains the translation rule expression as a string. The expressions may be in the form of "Use Originating Member Name" that just passes the member name from the originating data source to the target unchanged or in the form of="<target member name>" which operates to substitute the target member with a fixed name. The expression may also be in the form of=<string expression (originating member name)> which operates to provide a run time string manipulation function that converts the originating member into a member for the target data source. This expression may be any arbitrary function that takes the originating member and returns the target equivalent. By way of example, if the OLAP Member is "January", the relational equivalent is "Jan", the expression could be:

=Left(Member, 3)     (Expression 1)

In the translation example of Expression 1, this is all that is needed to translate members from one data source to another for a given originating structure. In general, when translating from an OLAP to Relational source, the OLAP cube Time dimension has a Year Level and the Relational source has a Universe Class of Time and Universe Object Year so the Year name is identical in both data sources, specifically, [Time].[1997]=Time.Year="1997". In this example, the translation map would be expressed as:

---

XlatnDimension: Time
  XlatnHierarch: Default
    XlatnLevel: Year
      XlatnItems     (Expression 2)
        StrucXlatn
          TargetStruc
            QualStrucs
              UnivClass = Time
              UnivObject = Year
            XlatnRule: "Use Originating Member Name"

---

While a structure translation with the above simple rules is ideal, there are many scenarios where a single translation rule does not apply to translating all members from a structure in the originating data source to the equivalent in the target data source. This is where a member translation (MembXlatn 1136) item can be applied. An example would be where the originating data source uses a name and the relational database uses a numerical ID. In this instance, there is no simple single translation expression that can be applied.

Another example would be where there are exceptions such as in Essbase where dynamic time series members like Y-T-D (Year to Date) have no corresponding member/value in a relational database. In this instance, a Member translation can be used for the Y-T-D member as an exception to the general structure translation rule and is not translated. The worst-case scenario is that each member for an originating data source structure (e.g. a dimension level) needs its own member translation.

In its simplest form, MembXlatn 1136 has only an enable/disable flag and a translation rule. The disable flag is used when a member should not be translated (typically as an exception as in the example Y-T-D, above). If enabled, the translation flag will be to specify the specific target data source equivalent such as by way of example:

OLAP Member:Lug Nut=Relational Member/Value:
   10234575     (Expression 3)

Member translations are always combined with a structure translation for a given originating data source structure. The structure translation points to the target object to translate to and supplies the default rule. The member translation(s) provide the rules to deal with the exceptions to the default rule. The worst case is the default rule is never applied and a member translation rule is required for each member in the originating data source. An example where a Y-T-D and P-T-D members exist along with Years for a level for an Essbase Time dimension is in the form of:

```
XlatnDimension: Time
    XlatnHierarch: Default
        XlatnLevel: Year
            XlatnItems
                StrucXlatn                              (Expression 4)
                    TargetStruc
                        QualStrucs
                            UnivClass = Time
                            UnivObject = Year
                        XlatnRule: "Use Originating Member Name"
                    MembXlatn: Unname = Y-T-D, Disabled
                    MembXlatn: Unname = P-T-D, Disabled
```

There are two additional important objects in the model; the parent translation proxy (DrillDataProxyKey 1138) and the member delegation proxy (XlatnMapProxyKey 1140). These are "proxies" that function to redirect the translation process to elsewhere in the map to perform the translations. The parent translation proxy is designed to deal with the issue where translating a member from one data source requires translating the member and several qualifying members in order to provide an unambiguous translation. One example is time where the task of translating Month=March is usually ambiguous without specifying a year. By allowing a translation item to include one or more parent translation proxies, the model can specify relevant additional qualifying members that are required to provide a semantically correct translation. This approach relies on the fact that the metadata for a member in the context model includes the qualifying members. Again, using the time example, the member "March" in the drilled data context will include it's qualifying members and structure information as illustrated in Expression 5.

```
                Member: Month
                    QualStructs
                        Dimension: Time
                        Hierachy: Default
                        Level: Month
                    Qaulifying Member
                        (Expression 5)
                        Member: 1997
                            QualStructs
                                Dimension: Time
                                Hierachy: Default
                                Level: Year
```

A Parent Translation Proxy's role is to point to the location in the translation map where the qualifying member will be produced and the qualifying information that will be acquired and used from the context model. To complete the example, the translation model for year that would use the context information is:

```
XlatnDimension: Time
    XlatnHierarch: Default
        XlatnLevel: Year
            XlatnItems
                StrucXlatn
                    TargetStruc
                        QualStrucs
                            UnivClass = Time                    (Expression 6)
                            UnivObject = Year
                        XlatnRule: "Use Originating Member Name"
XlatnDimension: Time
    XlatnHierarch: Default
        XlatnLevel: Month
```

-continued

```
            XlatnItems
                StrucXlatn
                    TargetStruc
                        QualStrucs
                            UnivClass = Time
                            UnivObject = Month
                        XlatnRule: "Use Originating Member Name"
                    DrillDataProxyKey: Year
```

Parent translation proxies are typically recursive. To illustrate, the city name "Paris" is ambiguous as there is a Paris in France, Canada and at least one in Tennessee. The same may be true of Sate/Province names. Therefore, the translation map for a geographic dimension that includes country, state/province and city would likely have the following translation map:

```
XlatnDimension: Geography
    ...
    XlatnLevel: Country
        ...
            UnivClass = Geography
            UnivObject = Country
        ...
XlatnDimension: Geography
    ...
    XlatnLevel: State/Prov
        ...                                                     (Expression 7)
            UnivClass = Geography
            UnivObject = State/Prov
        ...
        //Parent Translation Proxy
        DrillDataProxyKey: Country
    ...
XlatnDimension: Geography
    ...
    XlatnLevel: City
        ...
            UnivClass = Geography
            UnivObject = City
        ...
        //Parent Translation Proxy
        DrillDataProxyKey: State/Prov
```

In the above example, the proxy at the City level delegates to the State/Prov level to include the State/Prov, which in turn delegates to the Country level. The Member Delegation Proxy performs a similar role where there are gaps in the target data source. To illustrate, where an OLAP database has Year, Quarter and Month but the relational database only has Year and Month. Thus, to translate Quarter, Member Delegation Proxies are used to point the collection of months that should be used to provide the equivalent context as illustrated in Expression 8:

```
XlatnDimension: Time
    ...
    XlatnLevel: Quarter
        MembXlatn: Q1
            //Member Delegation Proxies
            XlatnMapProxyKey: Month, Member = January
            XlatnMapProxyKey: Month, Member = February
            XlatnMapProxyKey: Month, Member = March
        ...
XlatnDimension: Time                                            (Expression 8)
    ...
    XlatnLevel: Month
        ...
```

```
    UnivClass = Time
    UnivObject = Month
        ...
    //Parent Translation Proxy
    DrillDataProxyKey: Year
```

In this example, the Q1 member translation is delegating to the translation map for Time.Month. There is a substitution of the member at the quarter level, Q1 that is being replaced by the members at the month level with the months of Jan, Feb and Mar. The parent translation for Q1 is implicitly being passed so that the parent translation proxy for the Month level correctly identifies the Year. These components provide the bulk of the solution for the translation scenarios. Other scenarios, such as parent/child dimensions are resolved using simple flags to alert the translation algorithm to variations in processing. It is also possible to explicitly map from one originating member to multiple target objects. Other translation scenarios can be resolved by tools external to the UDS translation map such as when the administrator builds the originating and target databases.

The following are examples of how the Translation model is used to implement the translation map.

EXAMPLE 1

Disable Structure Translation

The disable structure translation is used in those instances where the administrators wish to restrict a source member translation for any members. For example, the administrator may prohibit translation of any members from an Accounts dimension. In another instance, the administrators may prohibit users drill-through for the top two levels in a cube and force drill-through to occur at lower level members only. The disable structure translation is an off-line build decision implemented by the UDS Designer. The administrator disables drill-through by adding an OLAP Dimension, Hierarchy or Level to the Translation Map and then clearing the "Translation Enabled" flag.

EXAMPLE 2

1:1 Mapping

All OLAP Members for a Dimension Level map 1:1 to self-qualified Universe Object Values such as illustrated in Table 1.

TABLE 1

| OLAP Example | Relational Translation |
| --- | --- |
| Dimension = Customers | Universe Class = Customer |
| Level = Country | Universe Object = Country |
| Member = France | Value = France |

Where OLAP cube members are the same as the Universe Object's Values (France=France), the Universe Object Value is unique in the relational data source and does not need to be qualified. This technique is referred to as structure mapping. For mapping from an OLAP cube to another data source, this is also referred to as level mapping. This scenario is usually only possible where the OLAP cube as constructed from a well-formed Relational Star Schema or a specific drill-through Relational database that was constructed for drill through. This scenario is rarely true for Essbase due to the unique naming technique in Essbase such that the term "March" cannot be used as a month name if there is more that one year in the database. Accordingly, in Essbase sources, the name must be made unique, usually through one of several name concatenation techniques such as 1997March or Mar97.

Structure mapping is built in UDS Designer because it only needs a single translation for all members for given OLAP Cube Level.

EXAMPLE 3

Qualified 1:1 Mapping

All OLAP Members for a Dimension Level map 1:1 to Universe Object Values, but must be qualified by other Values as illustrated in Table 2.

TABLE 2

| OLAP Example | Relational Translation |
| --- | --- |
| Member 1 | Need to pass multiple values to correctly |
| Dimension = Product | map Member 1 to the relational database |
| Level = Product Family | Universe Class = Product |
| Member = Food | Universe Object = ProductFamily |
| Level = Product Category | Value = Food |
| Member = Dairy | Universe Class = Product |
| Member 2 | Universe Object = ProductLine |
| Dimension = Product | Value = Dairy |
| Level = Product Family | |
| Member = Drink | |
| Level = Product Category | |
| Member = Dairy | |
| Dairy is not unique so it | |
| needs to be qualified by | |
| one or more parent | |
| members to be correctly | |
| mapped to relational values | |

Qualified 1:1 mapping is a variation on 1:1 mapping. In this case, the Universe Values that correspond to the OLAP Members are not unique and is frequently encountered in Microsoft Analysis Services cubes or when drilling from a relational source. Accordingly, there is the need to translate additional members to uniquely qualify the data for relational. When this occurs, it is handled in UDS by having the concept of Parent Translation Objects. Parent Translation Object points to the Parent Level that needs to be included to qualify the member. Parent Translation Objects can be added to a Level Translation when building the maps in UDS Designer so that products are qualified by their parents to be unique names.

The Translation Map objects would look as follows in Expression 9:

```
Level - Product Family
    Level Translation Object
        Target Universe Class = "Product"
        Target Universe Object = "ProductFamily"
        Translation Rule = Use Member
Level - Product Line
    (Expression 9)
    Level Translation Object
        Target Universe Class = "Product"
        Target Universe Object = "ProductLine"
        Translation Rule = Use Member
        Parent Translation: Product Family
```

EXAMPLE 4

1:1 Mapping with Member(s) Disabled

OLAP cubes often have members that do not translate either directly or indirectly to a relational data source. Essbase has special members for Dynamic Time Series that are not readily translated and MS OLAP can have calculated members in non-measures dimension. There are no corresponding relational values to map to directly or indirectly. Accordingly, another variation on 1:1 mapping is employed to achieve proper mapping. The case is where the 1:1 mapping works most of the time, but individual member translation objects are required to stop certain individual members from being translated. This mapping requires a Structure/Level Translation with supplemental Member Translations, which are set to "disabled" for specific members. One Member Translation is needed for each member that needs to be "disabled". A specific example for an Essbase cube is to disable passing a Dynamic Time Series member—YTD (Year to Date) is illustrated in Expression 10:

```
Dimension: Time
Level - Year
   Level Translation Object
      Target Universe Class = "Time"
   Target Universe Object = "Year"
   (Expression 10)
      Translation Rule = Use Member
   Member Translation Object: YTD
      Translation Enabled = "False"
```

EXAMPLE 5

Member Translation

In Member Translation, also known as member mapping, each OLAP member must have an individual translation expression for each relational value. For example, in OLAP: Dimension=Products; Level=part name; and Member="20 mm Screw" while in relational (Universe): Universe Class=Product; Universe Object=part number; and Value=124734. Since there is no translation expression that can manipulate the Member name to become the relational value, each OLAP member must be individually mapped to its relational equivalent.

EXAMPLE 6

1:1 Mapping with Member Exceptions

In 1:1 mapping some members must be treated as Member Exceptions. This occurs when most dimension members map to unique relational values, but some members do not. When the members do not map, then they need to be qualified. This mapping requires a Structure/Level Translation with supplemental member translations and delegation of OLAP members (for the level that is missing from the relational source to be delegated) to one or more relational values.

EXAMPLE 7

1:N Mapping for Members

A 1:N Mapping for Members occurs when an OLAP level translates to more than one translation object. To illustrate, in an OLAP source, members' names include both the first and last names while in the relational source, there are separate columns for the first and last names. In this mapping, a virtual column is created in the Universe model that does the required manipulation to create a relational value that maps to the OLAP member or an additional column can be created in the relational table.

EXAMPLE 8

1:N Mapping for Measures

When a calculated member in an OLAP cube does not map directly to a column in a relational database or when drilling through for a dynamically created query, it is desired to put the component parts of a calculation into the target report. An example is where there is a complex net present value calculation in OLAP and drilling through exposes all the individual measures as columns in the target report.

EXAMPLE 9

Skipped Structure(s)

When an OLAP level does not have a corresponding relational column, translation requires the delegation of OLAP members for the level that is missing from the relational source to be delegated to one or more rational values. To illustrate in OLAP source: Dimension=Sales Team; Levels=Country, Region, State/Province; Dimension=Time; and Levels=Year, Quarter, Month. In the relational source: Universe Class=Sales Group; Universe Objects=Country, Region, State/Province; Universe Class=Time; and Universe Objects=Year, Month. In this illustration, Quarter 1 would have to map to the months January, February, March, a process that is referred to as Member Redirect Translation.

EXAMPLE 10

Lowest Level Only

If only the lowest level Dimension Members for the Dimension exist in Relational, a Member Redirect Translation is required for every level to members at lower levels. To illustrate: In the OLAP source: Dimension=Time; Levels=Year, Quarter, Month, Week, Date; In the relational source: Universe Class=Time; and Universe Objects=Date results in need to support cascading redirection.

EXHIBIT 11

String Translatable OLAP Member Names

String manipulation can dissect the member name to produce the relational equivalent value when the OLAP name is a composite string or other name that can be predictably parsed to yield the Relational name. The need for string manipulation is typically required for Essbase source and requires a run-time [string] expression evaluation engine. To illustrate in OLAP source: Dimension=Time Level=Month; and Member=Mar97. In the relational source, two values must be passed: Universe Class=Time; Dimension=Year; Value="19"+Right(Member, 2); Class=Time; Dimension=Month; and Value=Left(Member, 3).

EXAMPLE 12

OLAP Members Belong to Parent/Child Dimension

Employees or part numbers or account dimensions are frequently based on relational parent/child table structures.

While an OLAP Cube user may see multiple levels, there is internally only one level at the relational source. Translations can be done via structure mapping or member mapping where the OLAP level is ignored. This is addressed by the dimension in the translation map having a flag that indicates it is a Parent/Child dimension.

EXAMPLE 13

OLAP Parent/Child Dimension with Non-unique Members

In some instances, the OLAP member selected for drilling is not unique so there is a need to qualify the member with additional information, such as an ID, which may be an OLAP attribute. To illustrate in the OLAP source: Dimension=Employees; Member=Fred Murray (which appears twice in the dimension although each appearance relates to different people with the same name). In the relational source: Universe Class=Customers; Universe Object=Employee Name; Value=Fred Murray; Universe Object=Employee ID; Value=43986 would enable the two appearances to be differentiated.

EXAMPLE 14

OLAP Member Translates to Range

Best shown by an illustration where in the OLAP source: Dimension=Time; Level=Year; Member=2000; Level=Month; Member=March and in the relational source: Universe Class=Time; Universe Object=Date; Value=Mar. 1, 2000 to Mar. 31, 2000. This becomes a Member Translation, which uses either a specified SQL expression or a string manipulation expression.

EXAMPLE 15

Values in Relational Drill Context are not Fully Qualified

For the SQL case where: Universe Class=Time; Universe Object=Month; and Value=March, there is an ambiguity as to which March has been selected. If there is nothing required in a relational query to fully qualify a value for a column in terms of how it maps to an OLAP cube. This either requires that the Relational drill-through extraction forces the user to create a fully qualified drill-context or the user will have to be prompted to select the specific member in the OLAP cube.

EXAMPLE 16

Multiple Members on Filter Axis (MS OLAP) Going to Essbase

Where the member=France, Canada, Thailand in one OLAP source, the user is prompted to select one of the members for drill-through. For Essbase there can only be a single member for any one dimension on the filter axis and there is no way to know which member to pick. This must be resolved by the OLAP destination query tool such as with a prompt or put the dimension on a different axis (e.g. outermost row dimension).

EXAMPLE 17

Same Data Source to Same Data Source

No translation is required because the drill-context from the originating report can be passed untranslated to the target report or query tool. However, it is noted that if the data sources are both relational, there is no known unique scenarios.

Translation Algorithms

The translation algorithm is incorporated into the methods for the classes and objects of the context and translation Models. The two work in concert to perform the translation. The translation process translates the context of the originating data source to that of the target. This translation requires that the "shape" of the context be preserved, but the specifics of the originating data source are translated to the target. In other words, if Time and Product are on the Row axis and Customer and Promotion are on the Column axis for the originating query, then the translated context must have the equivalents on the row and column axes, with the members/structures translated from the originating to the target data member/structure equivalents.

The UDS service takes the context and calls the method "translate" that walks through the structure of the context to find the first member. This causes the member to call it's translate method, which delegates to the translation model find the member/structure translation item to do the translation and to create the equivalent structure in the translated context and then translate the originating member to it's target equivalent. The translation proceeds as the context model walks through each of the members it contains until all are translated into their equivalents for the target data source. The translation process is illustrated in the pseudo code with the assumptions that the Drill-Through Service is running; the Drill-Through Map is loaded and available as an object model; the input Drill Data Model (input DDM) is loaded and available as an object model; no output Drill Data model yet exists; objects from the Output Drilled Data are prefaced with "o"; the DTS manager has determined the translation map to use; and that a "Return" is implied at the end of each chunk of code for each class.

The following pseudo code uses a call trace approach, where indentation indicates that the object that is servicing the call stack.

Pseudo Code:

```
/* in the DTS Manager, call the drilled data object to start translation, passing a pointer to
itself, and the Translation Map */
DrilledData:Translate(DTSManager, TranslationMap)
/* in object iDDM::DrilledData.Translate*/
// create a DDM and pass back a reference to the DDM object which creates a DrillData
object
// this also causes a DrilledCells collection, Axes Collection and Measures Dimension objects
to be created
// in the output DDM
TargetDataSourceType = TranslationMap.GetTargetDataSourceType( )
// create an output drilled data model (DDM) and return the top object
oDrilledData = DTSManager.CreateDDM(TargetDataSourceType)
```

```
// get the DrilledCells collection from the output DDM
oDrilledCells = oDrilledData.getDrilledCells( )
// delegate to the drilled cells collection, passing the reference to the DrillData object
DrilledCells.Translate(oDrilledCells, TranslationMap)
// for the filter axis (and for MS OLAP possibly the page axis)
oAxes = oDrilledData.getAxes( ); // get the drilled data Axes collection
Axes.Translate(oAxes, TranslationMap)
// for the measures Dimension, get the collection of type Measures (sub class of DataStrucs)
oMeasures = oDrilledData.getMeasures( );
Measures.Translate(oMeasures, TranslationMap)
/* in object iDDM::DrilledCells.Translate*/
For each DrilledCell
// delegate to the Drilled Cell
DrilledCell.Translate(OutputDrilledCells, TranslationMap)
/* in object iDDM::DrilledCell.Translate */
// Create an output DrilledCell. This automatically creates an Axis collection
oDrilledCell = oDrilledCells.AddDrilledCell( )
// get the Axes from the Drilled Cell
oAxes = oDrilledCell.GetAxes( )
// delegate to the Axes
    // assumes this automatically creates Axes collection in output DDM
Axes.Translate(oAxes, TranslationMap)
/* in object iDDM::Axes.Translate */
// delegate to the intput DDM Axis
For each Axis
// delegate to the Axis
Axis.Translate(TranslationMap, oAxes)
/* in object iDDM::Axis.Translate( )*/
//Create an Axis of the same type, if it does not exist
    //need to create new axis, based on this Axis in the input DDM Axes collection. Axis
type is Row, Column, etc.
oAxis = oAxes.AddAxis(this.AxisType)
/* At this point we stop adding objects to the output DDM as this now is where the output
datasource objects are added, which is done via each translation item. We also need to be able
to delegate to either a Dimensions or UnivClasses collection at this point. It is assumed that
the Axis class has a class of type DataStrucs
*/
/* get initial collection in output DDM. This of type DataStrucs, which is the abstract class
for the actual collection, which will be a Dimensions or UnivClasses collection, depending on
the target data source type. The output DDM should already know this from when the output
DDM was created
*/
oDataStrucs = oAxis.GetDataStrucs( )
// delegate to the dimensions or Universe Classes collection
DataStrucs.Translate(TranslationMap, oDataStrucs)
/* in object iDDM::Dimensions.Translate */
/* translate for each Dimension
For each Dimension in Dimensions
    Dimension.Translate(TranslationMap, oDataStrucs)
/* in object iDDM::Dimension.Translate */
// delegate to Hierarchies
Hierarchies.Translate(TranslationMap, oDataStrucs)
/* in object iDDM::Hierarchies.Translate */
// delegate to the intput DDM Hierarchy
For each Hierarchy in Hierarchies
// delegate to the Axis
Hierarchy.Translate(TranslationMap, oDataStrucs)
/* in object iDDM::Hierarchy.Translate( )*/
// delegate to Levels
Levels.Translate(TranslationMap, oDataStrucs)
/* in object iDDM::Levels.Translate */
// delegate to the intput DDM Hierarchy
For each Level in Levels
// delegate to the Axis
Level.Translate(TranslationMap, oDataStrucs)
/* in object iDDM::Level.Translate( ) */
// delegate to MDMembers or UnivValues (DataStrucs)
DataStrucs.Translate(TranslationMap, oDataStrucs)
/* in object iDDM::MDMembers.Translate( ) */
For each Member in Members
Member.Translate(TranslationMap, oDataStrucs)
/* in object iDDM::Member.Translate( ) */
/* at this point we delegate to the Translation map, passing the member and the place in the
output DDM to place the translated members
*/
TranslationMap.Translate(Member, oDataStrucs)
/* in object TranslationMap.Translate( ) */
    // will call the DataStructs object (which will be based on the type of translation map
DataStrucs.Translate(Member, oDataStrucs)
/* in object Translation Map::XlatnDimensions.Translate( ) */
```

```
// find the dimension in the translation map based on the dimension for the drilled data
member
TranslationDimension = Find(Member.GetDimensionUName( ))
    if (TranslationDimension != NULL ) Then
{
// found dimension, check for enabled
if (TranslationDimension.isEnabled = FALSE) then
Return // do not translate members from this Dimension.
TranslationHierarchies = TranslationDimension.GetHierarchies
TranslationHierarchies.Translate(Member, oDataStrucs)
}
else
{
// error - should have found a dimension - map must be out of sync with actual cube
Throw Error(Dimension not found)
}
Endif
/* in object Translation Map::XlatnHierarchies.Translate( ) */
// find the Hierarchy in the translation map based on the dimension for the drilled data
member
TranslationHierarchy = Find(Member.GetHierachyUName( ))
    if (TranslationHierarchy != NULL ) Then
{
// found Hierarchy, check for enabled
if (TranslationHierarchy.isEnabled = FALSE) then
Return // do not translate members from this Hierarchy
// Translate members in this hierarchy
TranslationLevels = TranslationHierarchy.GetLevels( )
TranslationLevels.Translate(Member, oDataStrucs)
}
else
{
// error - should have found a Hierarchy - map must be out of sync with actual cube
Throw Error(Hierarchy not found)
}
Endif
/* in object Translation Map::XlatnLevels.Translate( ) */
// find the Level in the translation map based on the dimension for the drilled data member
TranslationLevel = Find(Member.GetLevelUName( ))
TranslationLevel.Translate(Member, oDataStrucs)
/* in object Translation Map::XlatnLevel.Translate( ) */
    if (TranslationLevel != NULL ) Then
{
// found Level, check for enabled
if (TranslationLevel.isEnabled = FALSE) then
Return // do not translate members from this Level
// Translate members in this Level
TranslationItems = TranslationLevel.GetXlatnItems
TranslationItems.Translate(Member, oDataStrucs)
}
else
{
// error - should have found a Level - map must be out of sync with actual cube
Throw Error(Level not found)
}
Endif
/* in object TranslationMap::XlatnItems.Translate */
// first search by member unique name
TranslationItem = Find(Member.getUName( ))
if (TranslationItem == NULL) Then
// if no MembXlatn then search by structure unique name, which in the case of OLAP is
Level
if TranslationMap.Type == OLAP then
TranslationItem = Find(Member.getLevelUName( ))
else
TranslationItem = Find(Member.getUnivClassUName( ))
Endif
Endif
    if (TranslationItem != NULL ) Then
{
// found translation item, translate
TranslationItem.Translate(Member, oDataStrucs)
}
else
{
// error - should have found a Translation item - model incorrect - corrupt or incorrect
Throw Error(Translation Item not found)
}
Endif
/* in object TranslationMap::MembXlatn.Translate( ) */
```

```
//Check for XlatnSets
if (XlatnSets != Null) then
For each XlatnSet in XlatnSets
{
XlatnSet.Translate(Member, oDataStrucs)
}
else
// incorrect translation map - error
    Throw Error(No Translation Sets)
Endif
/* in object TranslationMap::XlatnSet.Translate( ) */
// Code for Member version of XlatnSet( )
/* should have either Proxies or a XlatnRule, but not both */
if (ProxyXlatnKeys != NULL AND XlatnRule !=NULL) Then
    ThrowError(Map error - has both XlatnRule and Proxies for a MembXlatn)
if (ProxyXlatnKeys == NULL AND XlatnRule ==NULL) Then
    ThrowError(Map error - missing translations for XlatnSet for a MembXlatn)
If (XlatnRule != NULL) then
/* call the StrucXlatn rule for this XlatnItem, passing the XlatnRule to override the general
one. This is done by first walking up the parents to the XlatnItems and then look for a
structure item - which, if not there is an error. Otherwise call the StrucXlatn object's
Translate method that takes three parameters a Drill Data member, the ooutput DDM postion
to add Translations and an overriding XlatnRule as a reference.
*/
// assume that getParent returns a object of the type of the parent - in this case an XlatnSets
collection
TranslationSets = this.getParent( );
TranslationItem = TranslationSets.getParent( );
TranslaitonItems = TranslationItem.getParent( );
// find the StrucXlatn item by doing a find on the structure unique member name
if TranslationMap.Type == OLAP then
TranslationItem = Find(Member.getLevelUName( ))
else
TranslationItem = Find(Member.getUnivClassUName( ))
Endif
    if (TranslationItem != NULL ) Then
{
// found translation item, translate, passing the member, the pointer to the output DDM
addition point and
// the overriding data rule.
TranslationItem.Translate(Member, oDataStrucs, &XlatnRule)
}
else
{
// error - should have found a Translation item - model incorrect - corrupt or incorrect
Throw Error(Translation Item not found)
}
Endif
else
    // do the proxy translations (which mus be XlatnMapProxyKeys)
ProxyXlatnKeys.Translate(Member, oDataStrucs)
endif
/* in object TranslationMap::ProxyXlatnKeys.Translate( ) */
    For each ProxyXlatnKey in ProxyXlatnKeys
        ProxyXlatnKey.Translate(Member, oDataStrucs)
/* in object TranslationMa    p::XlatnMapProxyKey.Translate( ) */
MemberTranslation = find(UName) // find the MembXlatn member pointed to by the proxy
/* note. In this case, the Member is not used, but the oDataStrucs is */
MemberTranslation.Translate(Member, oDataStrucs)
Return
/* in object TranslationMa    p::DrilledDataProxyKey.Translate( ) */
/* A DrilledDataProxy key delegates to a translation at for different Level or Class than the
current one. It takes the qualifying member from the member at the same level or class and
translates it.
*/
/* find the DataStruc (XlatnLevel or XlatnUnivObject) in the translation map for which the
UName for this object points to
*/
DataStruc = findDataStruc(Uname)
/* Get the qualified member for the same Level (or Universe Object)
// scan through the qualifying members for Member to find the one where the qualifying
DataStruc matches UName
Member = findMember(Member, UName)
/* note: we need to ensure that it adds the member at the right location */
DataStruc.Translate(Member, oDataStrucs)
Return
/* in object TranslationMap::StrucXlatn.Translate( ) */
/* There are two Translation methods for StrucXlatn */
Translate(Member, oDataStrucs) // for calling directly from an XlatnItems collection
// find if there is a XlatnRule (I think there has to be), then call the next
```

```
XlatnSet = FindXlatnSet(this) // find the default/general XlatnRule for this StrucXlatn
Translation(Member, oDataStrucs, &XlatnRule) // call, passing the reference
Return
Translation(Member, oDataStrucs, &XlatnRule) // for calling from an MembXlatn item
/* First it will process the XlatnRule and it's associated TargetStruc, addin the first Member,
then it will process any Proxy Translation Keys
*/
/* A working assumption is the UnvClass and UnvObject names for the TargetStruc class are
unique names that match the ones that would be in the DDM. I will assume so for now
*/
// use XlatSets to find the TargetStruc for this StrucXlatn - there should only be one.
TargetStruc = XlatnSets.findTargetStruc( );
// Get the unique name of the Universe Class
DataStrucUName = TargetStruc.getUnvClass( )
// find if the UnivClass already exists already exists.
oDataStruc = oDataStrucs.find(DataStrucUName)
if (oDataStruc == NULL) then
// if not found, then add an item to this class, which is a Universe Class
oDataStruc = oDataStrucs.Add(DataStrucUName);
// Now add the class, first checking if it already exists.
ODataStrucs = oDataStruc.getDataStrucs( ); // get the Universe Objects collection from the
Universe Class
DataStrucUName = TargetStruc.getUnvObject( ); // get the Universe Object to add
// find if the UnivObject already exists already exists.
oDataStruc = oDataStrucs.find(DataStrucUName)
if (oDataStruc == NULL) then
// if not found, then add an item to this class, which is a Universe Object
oDataStruc = oDataStrucs.Add(DataStrucUName);
// now use the XlatnRule to add the value
ODataStrucs = oDataStruc.getDataStrucs( ); // get the Universe Values collection from the
Universe Object
// assume to just add a value, should not be duplicates. May need additional code to check.
/* get the value by delgating to the DTSManager to use a translation module according to the
rule type.
If it can't do the translation it should throw an Error.
*/
try
{
DataStrucUName = DTSManager.ProcessXlatnRule(&XlatnRule);
}
catch
{
// various errors
}
// add the value to the collection
oDataStruc = oDataStrucs.Add(DataStrucUName);
// add the member information
oDataStruc.setUnivClassName(TargetStruc.getUnvClass( ))
oDataStruc.setUnivObjectName(TargetStruc.getUnvObject( ))
Return
```

Alternative Run-time Architecture

The present invention provides a universal drill-through translation model that can translate between any two data sources that have structures and values that can be unambiguously mapped to each other with 1:1 through M:N basis. This drill-through model supports drill-through mapping scenarios between OLAP and relational, OLAP and OLAP, relational to OLAP and relational to relational data sources.

Figure 12:
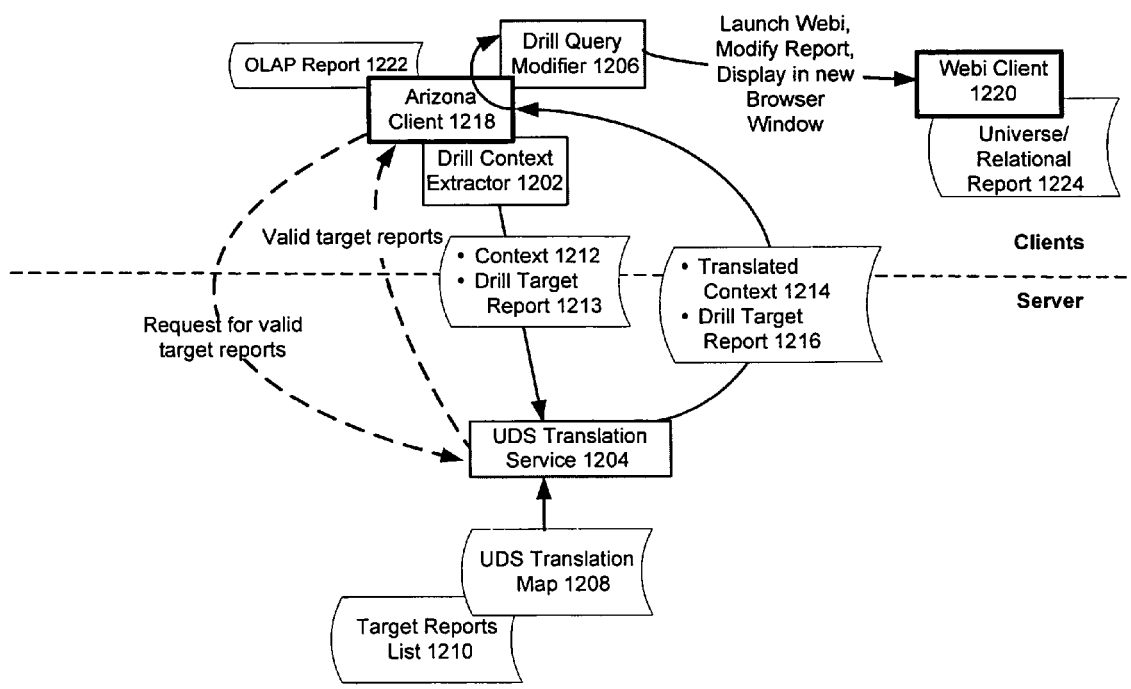
FIG. 12 illustrates an alternative embodiment of the UDS run-time architecture of the present invention

A universal drill-through data model that permits sending and receiving the drill-through context from and to any data source, for any business intelligence tool, including third-party tools. This model uses a data source agnostic query specification that can do simple filtering or be used to automatically build a target report. As a further example, an alternative embodiment of a USD run-time architecture is shown in FIG. 12. The UDS components include a drill context extractor 1202, a UDS translation service 1204 and the drill query modifier 1206. Data and metadata are handled by UDS translation map 1208, target reports list 1210, context model 1212 and drill target report 1213, translated context 1214, selected drill target report 1216. External to UDS, a client 1218, such as a OLAP Thin Web client marketed by Business Objects, S.A. the assignee of the present invention and a Webi client 1220, also marketed by Business Objects, S.A., which is a relational thin web client.

The workflow of the system begins when a user selects a context from a report, such as OLAP report 1222, in client 1218 and selects to drill through. Client 1218, which is executing on a computer system such as a personal computer, sends a request to the UDS translation service 1204 for a list of target reports, from target list reports 1210, that are valid for the OLAP cube that report 1222 is based on. Client 1218 presents the list of the reports to the user. The user selects one of the reports from the list and to launch the drill-through process. The drill-through process launches, the drill-context extractor 1202 to build the drill context using context model 1212. This interaction preferably occurs at the C++ level. Drill-context extractor 1202 then has the context model 1212 exported as an XML representation.

The XML representation includes information on the originating and target data source, the selected drill target report and related metadata. The XML representation is passed via a TCP/IP port to UDS translation service 1204, which is executing on server in server environment 118. UDS translation service 1204 uses UDS translation map 1208 associated with the originating data source relating to report 1222 and the data source of the target report. UDS translation service 1204 then translates the context.

The translated context is packaged with the drill-target report 1216 and exported as a XML package. The XML package is received by client 1208, which passes report 1216 to Drill-query modifier 1206. Drill-query modifier 1206 opens the target report in Webi client 1220. Using the translated context, it navigates the members and translates them into relational conditions using the Webi query API, associated with client 1220 modifying the "where" clause in the Webi report and adding the new conditions. Webi client 1220 is launched, and the report is presented to the user. The user can navigate and modify the Webi report 1224 without restriction.

A target client proxy (not shown) may be incorporated as a component to accept translated drill context. The proxy component will manage locating and launching the target query tool, modifying or building a target report and then launching the target report for the user with the target tool providing and registering the target client proxy with UDS translation service 1204 to decouple the UDS system from access and interface issues with the target tools.

Although the invention has been described with respect to specific embodiments thereof, these embodiments are merely illustrative, not exclusive, of the invention. For example, the invention can be used to create relationships among different types of data whether in the same, or different, systems or databases. Although the invention has been presented primarily with respect to "drill-down" from higher-level data presentations to lower ones, relationships can be "upward" from lower level to higher level, or "sideways" among data considered at the same level. Also, any type of database can be used in addition to the specific types (e.g., OLAP, relational, specific manufacturer's, etc.) discussed herein. It is to be understood that this invention shall not be limited to the specific construction and arrangements shown and described since various modifications or changes may occur to those of ordinary skill in the art without departing from the spirit and scope of the invention as claimed. Thus, the scope of the invention is to be determined solely by the appended claims.

What is claimed is:

1. A computer readable storage medium, comprising executable instructions to:
   receive from a first report a selection of values establishing context information specifying dimensional criteria defining a first value in a first data source, wherein the first report includes a query specification and a layout specification, and wherein the first data source is a relational data source;
   define a translation model specifying a translation context between the first value in the first data source and a second value in a second data source, wherein the translation context comprises a translation map specifying rules for mapping the context information defining the first value in the first data source to the second value in the second data source, wherein the second data source is a non-relational data source;
   generate a context transfer to the second value in the second data source based upon the dimensional criteria of the context information defining the first value in the first data source, the translation model and the translation map;
   generate a second report from the second data source based upon the context transfer; and
   supply the second value in the second report such that a user observes the second value from the same perspective associated with the first value in the first data source.

2. The computer readable storage medium of claim 1 wherein the context information is user specified.

3. The computer readable storage medium of claim 1 wherein the context information is automatically generated.

4. The computer readable storage medium of claim 1 wherein the first value is qualified by one or more parent objects.

5. The computer readable storage medium of claim 4 further comprising executable instructions to:
   designate a selected parent object; and
   generate a parent translation object from the selected parent object.

6. The computer readable storage medium of claim 1 wherein the executable instructions to generate include executable instructions to generate a context transfer to a plurality of values.

7. The computer readable storage medium of claim 1 wherein the executable instructions to generate include executable instructions to generate a context transfer to a range of values.

8. The computer readable storage medium of claim 1 further comprising executable instructions to specify an administrator interface to configure context transfer operations.

* * * * *